US010237737B2

(12) United States Patent
Sengoku

(10) Patent No.: US 10,237,737 B2
(45) Date of Patent: Mar. 19, 2019

(54) NAVIGATION SERVER AND NAVIGATION CLIENT

(71) Applicant: HONDA MOTOR CO., LTD., Tokyo (JP)

(72) Inventor: Koji Sengoku, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 14/524,082

(22) Filed: Oct. 27, 2014

(65) Prior Publication Data

US 2015/0121472 A1 Apr. 30, 2015

(30) Foreign Application Priority Data

Oct. 30, 2013 (JP) .................................. 2013-225522

(51) Int. Cl.
*G01C 21/26* (2006.01)
*H04L 29/06* (2006.01)
(Continued)

(52) U.S. Cl.
CPC ............ *H04W 12/08* (2013.01); *G01C 21/26* (2013.01); *H04L 67/42* (2013.01); *H04W 4/029* (2018.02);
(Continued)

(58) Field of Classification Search
CPC ....... H04L 67/22; H04L 67/306; H04L 63/08; H04W 4/025; H04W 4/046; H04W 12/06;
(Continued)

(56) References Cited

U.S. PATENT DOCUMENTS 8,863,243 B1 * 10/2014 Lidzborski ............ G06F 21/316
709/245
9,104,537 B1 * 8/2015 Penilla .................... G06F 17/00
(Continued)

FOREIGN PATENT DOCUMENTS

JP 2001-283003 A 10/2001
JP 2007-200174 A 8/2007
(Continued)

OTHER PUBLICATIONS

Japanese Office Action application No. 2013-225522 dated Sep. 8, 2015.

*Primary Examiner* — Tae K Kim
(74) *Attorney, Agent, or Firm* — Squire Patton Boggs (US) LLP

(57) ABSTRACT

Provided is a navigation server and a navigation client capable of protecting information specific to each user that is transmitted from the navigation client to the navigation server securely without degrading user-friendliness. A navigation server 100 is configured to, prohibit the navigation client 200 from accessing the navigation server 100 when a navigation client 200 meets a second condition that is determined from past communication contents with the navigation client 200. The navigation server 100 is configured to, make the navigation client 200 output a message urging to input a new authentication code based on a communication with a navigation client 200 that is prohibited by the server arithmetic processing element 110 from accessing the navigation server 100.

5 Claims, 17 Drawing Sheets

(51) Int. Cl.
*H04W 12/06* (2009.01)
*H04W 12/08* (2009.01)
*H04W 4/029* (2018.01)
*H04W 64/00* (2009.01)
*H04W 4/04* (2009.01)

(52) U.S. Cl.
CPC ........... *H04W 4/046* (2013.01); *H04W 12/06* (2013.01); *H04W 64/00* (2013.01); *H04L 63/08* (2013.01); *H04L 63/107* (2013.01); *H04L 63/108* (2013.01)

(58) Field of Classification Search
CPC ....... H04W 12/08; H04W 12/02; H04W 4/02; H04W 4/028; G06F 21/31; G06F 21/00
USPC ............................................... 340/989; 726/1
See application file for complete search history.

(56) References Cited

U.S. PATENT DOCUMENTS

| | | | | |
|---|---|---|---|---|
| 2003/0233361 A1* | 12/2003 | Cady | ........................ | H04L 63/08 |
| 2004/0102897 A1* | 5/2004 | Watanabe | ............ | G01C 21/367 |
| | | | | 701/454 |
| 2005/0005128 A1* | 1/2005 | Lambert | .................. | G06F 21/34 |
| | | | | 713/182 |
| 2005/0102154 A1* | 5/2005 | Dodd | ...................... | G06Q 10/06 |
| | | | | 705/7.32 |
| 2006/0294392 A1* | 12/2006 | Veprek | .................... | G06F 21/31 |
| | | | | 713/183 |
| 2008/0268810 A1* | 10/2008 | Kobayashi | ............. | G06Q 30/06 |
| | | | | 455/405 |
| 2010/0175116 A1* | 7/2010 | Gum | ........................ | G06F 21/31 |
| | | | | 726/6 |
| 2013/0321178 A1* | 12/2013 | Jameel | ................... | G08G 1/202 |
| | | | | 340/989 |
| 2014/0046888 A1* | 2/2014 | Husain | .................. | H04L 67/306 |
| | | | | 706/46 |

FOREIGN PATENT DOCUMENTS

| | | |
|---|---|---|
| JP | 2009-059259 A | 3/2009 |
| JP | 2010-146095 A | 7/2010 |
| JP | 2011-103115 A | 5/2011 |
| WO | WO 2012/077425 A1 | 6/2012 |

* cited by examiner

FIG. 3 A
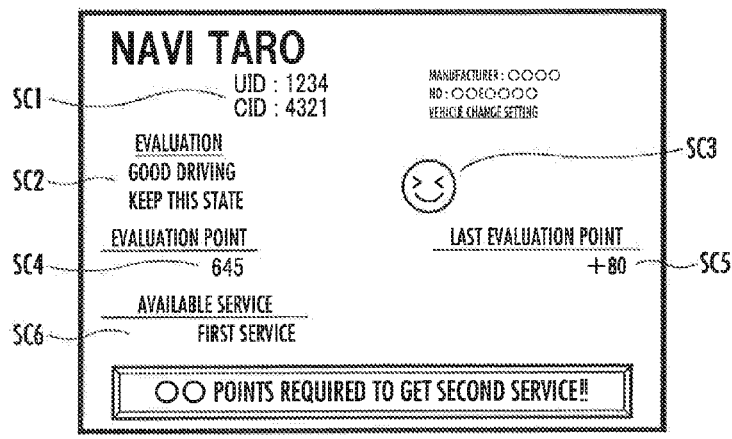
FIG. 3 B
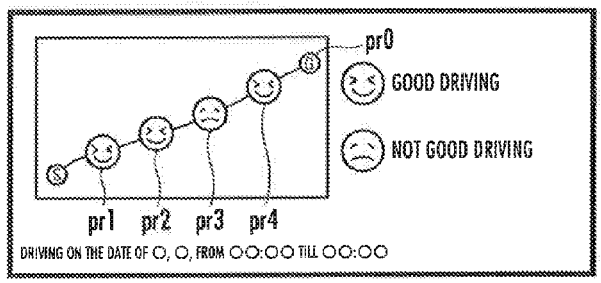
FIG. 3 C
FIG. 3 D
FIG. 3 E

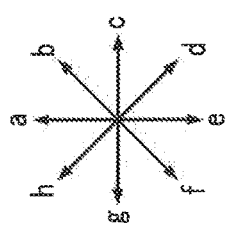
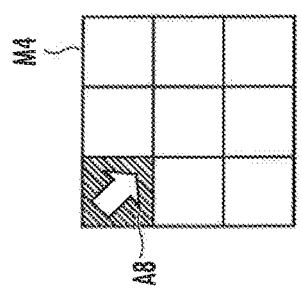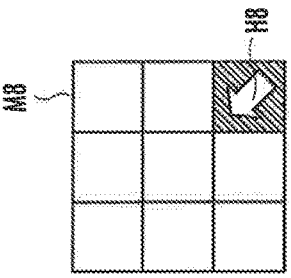
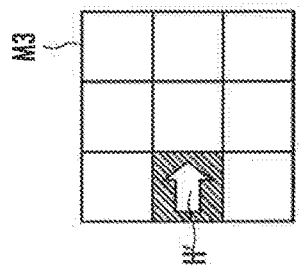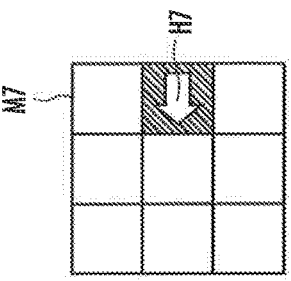
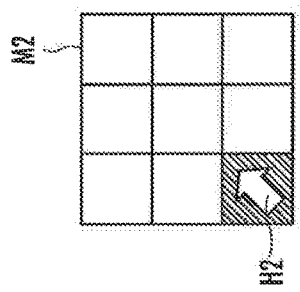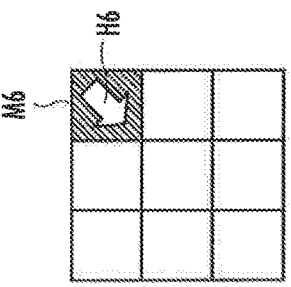
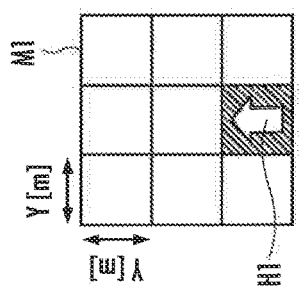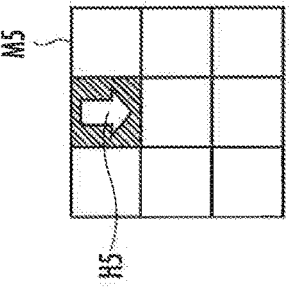
FIG.6A FIG.6B FIG.6C FIG.6D
FIG.6E FIG.6F FIG.6G FIG.6H
FIG.6I

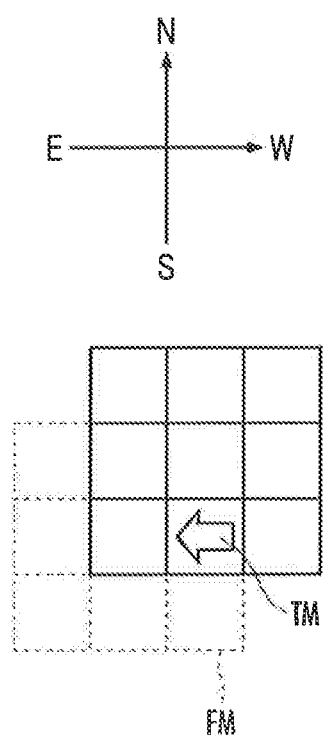

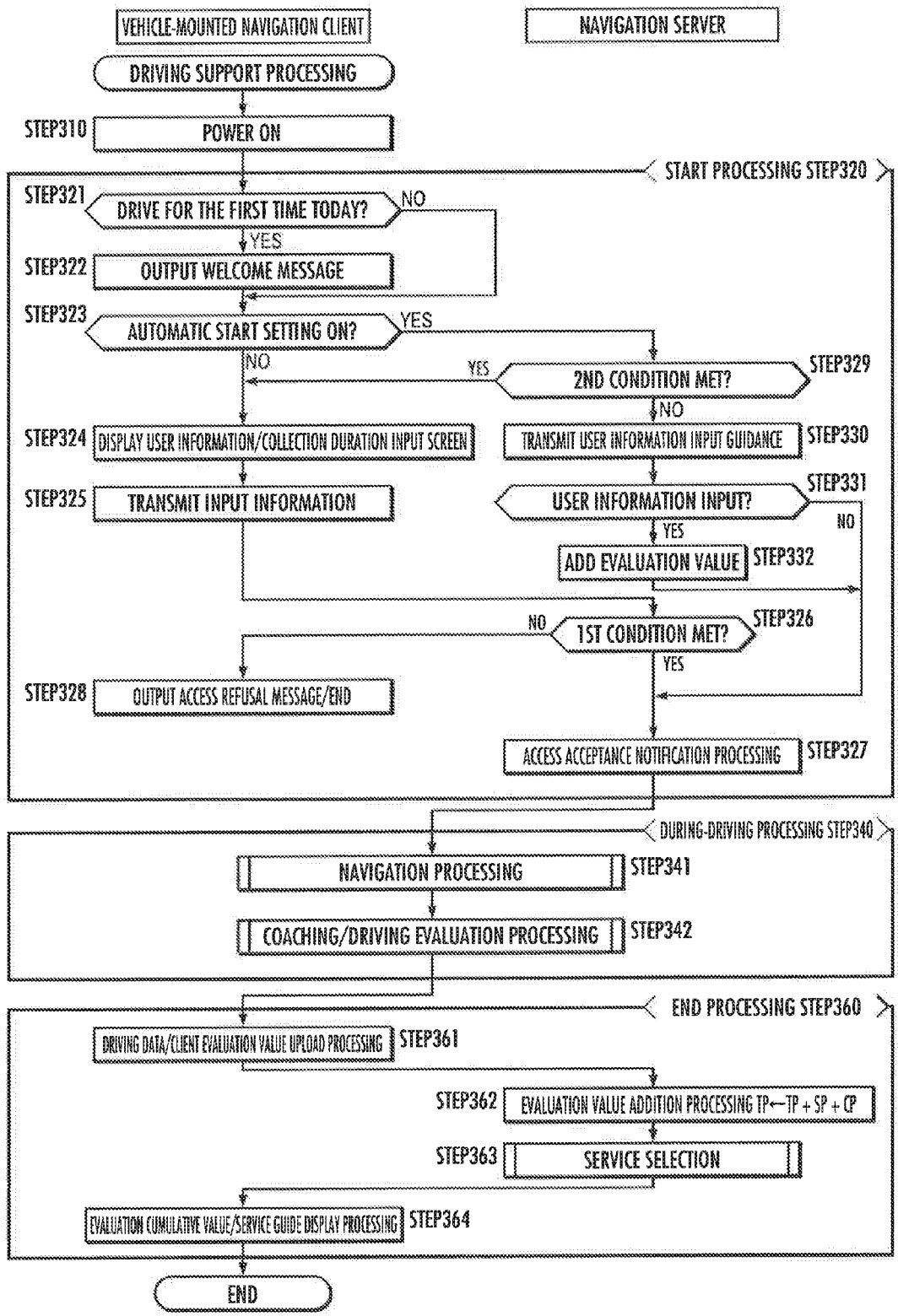

FIG. 9
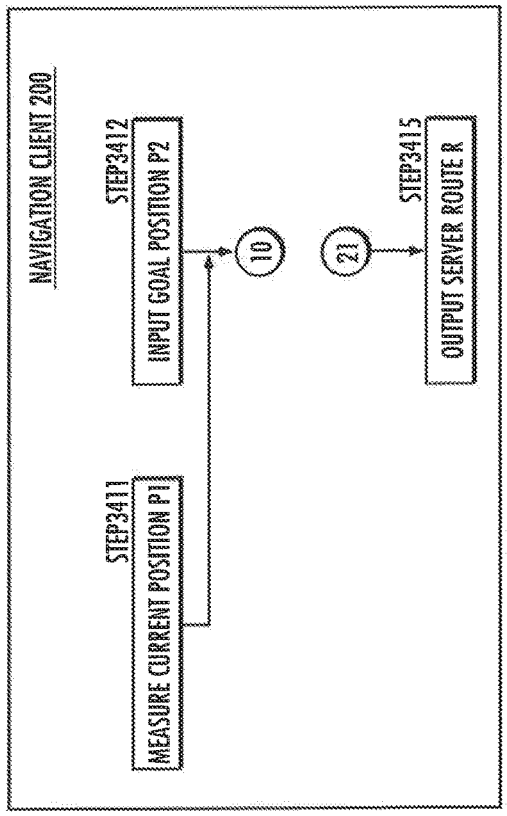
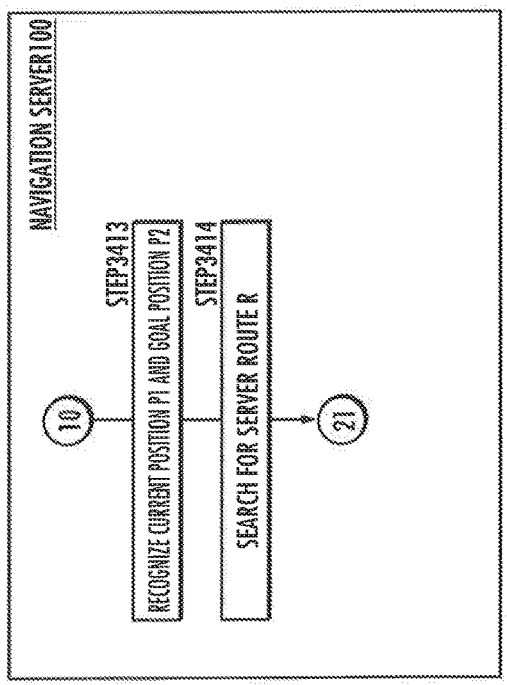

NAVIGATION SERVER AND NAVIGATION CLIENT

BACKGROUND OF THE INVENTION

1. Field of the Invention

The present invention relates to navigation clients and navigation servers.

2. Description of the Related Art

A system is known, including a navigation client mounted on a vehicle that displays time-course data indicating a correlation between fuel consumption or the like and driving index values or the like of the vehicle, or an evaluation result thereof that is stored in a navigation server, thus allowing a user of the vehicle to recognize how to adjust the fuel consumption or the like of the vehicle (see WO 2012/0077425).

SUMMARY OF THE INVENTION

However, if the user of the navigation client is changed (e.g., the navigation client together with the vehicle is transferred to another person), information on the ex-user transmitted from the navigation client to the navigation server may be viewed by a new user of the navigation client unless setting of the navigation client is updated, so there was a problem that information protection was not secured.

Meanwhile, a user may feel troublesome when being requested to perform a predetermined operation to receive a service through the navigation client, every time the navigation client is switched from OFF to ON, which degrades the user-friendliness of the navigation client.

Then, it is an object of the present invention to provide a navigation server and a navigation client capable of protecting information specific to each user that is transmitted from the navigation client to the navigation server securely without degrading user-friendliness.

A navigation server of the present invention comprises a server communication device, a server authentication arithmetic processing element, and a server storage element to store data. The server storage element is configured to associate an authentication code specific to a user of a navigation client and a first information specific to the user that is received from the navigation client via the server communication device for storage, the server communication device is configured to recognize an authentication code that is input last time at the navigation client based on a communication with the navigation client, the server authentication arithmetic processing element is configured to, when the navigation client meets a first condition that the authentication code recognized by the server communication device is stored in the server storage element, permits the navigation client to access the navigation server, and when the navigation client meets a second condition that is determined based on past communication contents with the navigation client, prohibit the navigation client from accessing the navigation server, based on a communication with a navigation client that is permitted to access the navigation server by the server authentication arithmetic processing element, the server communication device makes the navigation client recognize the first information that is associated with the authentication code of the user and is stored in the server storage element, and based on a communication with a navigation client that is prohibited from accessing the navigation server by the server authentication arithmetic processing element, to make the navigation client output a message urging to input the authentication code newly.

A constituent element as a hardware "recognizing" information means that the constituent element performs every possible information processing of information to prepare the information ready for other information processing, for example, the constituent element receiving the information; searching for or reading the information from a database or memory; calculating, estimating, configuring, determining, searching for the information or the like by arithmetic processing on the basis of the received basic information or the like; visualizing the information by decoding packets; and storing the calculated information or the like in memory, or the like.

Further, a constituent element as a hardware "outputting" information means that the constituent element outputs the information in any possible form such as display, voice output, vibration output and the like, which may be recognized by a human being by means of their five senses such as seeing, hearing, touching, and the like.

The "first information" is information specific to the user of the navigation client that the server authentication arithmetic processing element receives from the navigation client via the server communication device, and for instance, includes information that is set at the navigation client in the initial state (such as an identifier to identify the navigation client), information that is updated by an operator or the like during maintenance and information that is collected by the navigation client or the user's vehicle during travelling or stopping of the user's vehicle (driving data which indicates a driving member of the user's vehicle (control information, route information, positional information, temporal information of the vehicle, and the like)).

According to the navigation server of the present invention, when the navigation client meets the "first condition", the navigation client is permitted to access the navigation server. The "first condition" is that "an authentication code that the server communication device recognizes is stored in the server storage element". Thereafter, when the navigation client meets the "second condition", the navigation client is prohibited from accessing the navigation server. The "second condition" is a condition "that is determined based on the past communication contents with the navigation client".

After prohibiting the navigation client from accessing the navigation server, in order to return the access to the permissible state so as to allow the navigation client to receive a service including the provision of the first information specific of the navigation client based on a communication with the navigation server, the user is required to input the authentication code specific to the user that is stored in the server storage element beforehand to the navigation client.

This configuration can avoid the situation where, even when the navigation client meets the first condition once, the navigation client receives a service unconditionally, which results in that the state where a third person acquires the first information of another person is continued unlimitedly. This configuration, on the other hand, can avoid the user from being requested to input the authentication code every time when starting the navigation client, during a predetermined duration after the navigation client meets the first condition. This can protect information specific to the user within the range not degrading user-friendliness.

In the navigation server of the present invention, the server storage element may be configured to associate in advance the authentication code of the user with an evaluation cumulative value of the user that is accumulated when the navigation client is used, for storage, the server authentication arithmetic processing element may be configured to select a service that the user can use in accordance with the evaluation cumulative value of the user, and the server communication device may be configured to make the navigation client output access information to make a notification of the service.

The "access information to notify the evaluation cumulative value of the user" is information to allow a user to access to receive the notification on the evaluation cumulative value of the user, which includes information related to the location of the evaluation cumulative value such as a HTTP address, information to make an inquiry about the evaluation cumulative value such as a Mail address, information on how to acquire the evaluation cumulative value by an application or the like, to which a terminal other than the navigation client that outputs the access information also can access.

According to the thus configured navigation server, the navigation client is requested to output access information, which can urge the user of the navigation client to use a terminal that is different from the navigation client outputting the access information. This can protect information specific to the user within the range of not degrading user-friendliness.

In the thus configured navigation server, the server authentication arithmetic processing element may be configured to make the navigation client output a message urging to input the authentication code even when the second condition is not met in a communication via the server communication device, and also to add, to the evaluation cumulative value, an evaluation value corresponding to the newly input of the authentication code when the second condition is not met, and store a resultant to the server storage element.

According to the thus configured navigation server, since an evaluation value is given in response to newly inputting of the authentication code during the term when the second condition is not met, a user can be motivated to update the setting of the navigation client at any time. As a result, setting of the navigation client can be updated appropriately based on the intention of the user, and the situation where old user information is left in the navigation client can be avoided, and so information specific to the user can be protected within the range of not degrading user-friendliness.

In the thus configured navigation server, the first information may include second information that is specific to the user, which is collected by the navigation client or a user's vehicle with the navigation client mounted thereon.

The "second information" is information that is collected by the navigation client or the user's vehicle and is specific to the user of the navigation client, which may be information including driving data (control information, route information, positional information, temporal information of the vehicle) indicating the driving manner of the user's vehicle, for example.

According to the thus configured navigation server, information including the second information, which is often transmitted from the navigation client to the navigation server, can be protected. Therefore, the server can protect the information including the second information from a third person, and can provide a service utilizing the second information to an appropriate user.

In the thus configured navigation server, the second information may include information of a parking position and a parking duration of the user's vehicle, and the second condition may be at least one of conditions including: a condition that a parking position where the user's vehicle is parked most frequently or for a longest time, which is shown in the second information received from the navigation client during a predetermined first duration is different from a parking position where the user's vehicle is parked most frequently or for a longest time, which is shown in the second information received from the navigation client during a predetermined second duration that is different form the first duration, and a condition that a plurality of parking positions where the user's vehicle is parked frequently or for a long time among parking positions of the user's vehicle that are shown in the second information received from the navigation client during a predetermined third duration are all different from parking positions where the user's vehicle is parked that are shown in the second information received from the navigation client during a predetermined fourth duration that is different from the third duration.

When a parking position where the vehicle was parked the most frequently or for the longest time during a first duration and a parking position where the vehicle was parked the most frequently or for the longest time during a second duration that is different form the first duration, which is shown in the past communication contents with the navigation client, are different, there is a possibility that the navigation client is transferred or is lent to a third person.

When any one of parking positions where the vehicle was parked frequently or for a long time among parking positions of the vehicle that are shown in the past communication contents with the navigation client during a third duration is not the same as parking positions where the vehicle was parked during a predetermined fourth duration that is different from the third duration, there is a possibility that the navigation client is transferred or is lent to a third person.

According to the navigation server of the present invention that is configured based on these points, if the navigation client may be transferred or lent to a third person, an access of the navigation client to the navigation server is prohibited, and a message requesting the input of an authentication code is output to the navigation client. As a result, information specific to the user can be protected in the range not degrading the user-friendliness.

In the thus configured navigation server, the second condition may be at least one of conditions including: a condition that a predetermined fifth duration has passed since the authentication code is input at the navigation client last time, which is specified based on past communication contents with the navigation client; and a condition a sixth duration has passed since an access is made to the navigation server from the navigation client last time, which is specified based on past communication contents with the navigation client.

When a predetermined fifth duration has passed since an authentication code was input last time, which is specified based on the past communication contents with the navigation client, there is a possibility that the navigation client is transferred or is lent to a third person. When a predetermined sixth duration has passed since the access was made to the navigation server last time, which is specified based on the past communication contents with the navigation client as well, there is a possibility that the navigation client is transferred or is lent to a third person.

According to the navigation server of the present invention that is configured based on these points, when there is a possibility that the navigation client is transferred or lent to a third person, an access of the navigation client to the navigation server is prohibited, and a message requesting the input of an authentication code is output to the navigation client. As a result, information specific to the user can be protected in the range not degrading the user-friendliness.

In the thus configured navigation server, the server communication device may be configured to recognize the authentication code and the first information based on communication with the navigation client, and the server storage element may be configured to associate the authentication code and the first information, which are recognized by the server communication device, for storage.

The thus configured navigation server can avoid the situation where a third person can acquire the first information of another person, which is recognized with a communication with the navigation client, is continued unlimitedly. This can protect the first information of the user in the range not degrading user-friendliness.

A navigation client of the present invention includes: an information storage element to record information; a client input element to enable information input through a user's operation, a client output element to output information stored in the information storage element; and a client arithmetic processing element. The client input element is configured to allow input of a collection duration of first information at the navigation client, and the client arithmetic processing element is configured to store the first information during the collection duration in the information storage element in a form of enabling output to the client output element, and not to collect the first information other than during the collection duration, or to record the first information collected other than during the collection duration in the information storage element in a form of disabling output to the client output element.

Herein the information storage element may be a storage device provided in the navigation client, or a storage device located outside of the navigation server or the like.

According to the thus configured navigation client, the collection duration of the first information can be designated by a user, and so the first information intended by the user can be utilized at the navigation client and the navigation server, whereas the first information that is collected against the intention of the user is not viewed by another user. This results in protection of information specific to the user in the range not degrading user-friendliness.

BRIEF DESCRIPTION OF THE DRAWINGS

FIG. 3A is a driving history confirmation page that is displayed on a navigation client or a communication terminal.

FIG. 3B is a past driving history confirmation page that is displayed on the navigation client or the communication terminal.

FIG. 3C is a user information input screen that is displayed on the navigation client or the communication terminal.

FIG. 3D is a user information registration screen that is displayed on the navigation client or the communication terminal.

FIG. 3E is a screen guiding to a driving history confirmation page that is displayed on the navigation client or the communication terminal.

FIGS. 6A-6I illustrate how to estimate a sudden deceleration direction for each direction about sudden deceleration, where FIG. 6A is north, FIG. 6B is northeast, FIG. 6C is east, FIG. 6D is southeast, FIG. 6E is south, FIG. 6F is southwest, FIG. 6G is west, and FIG. 6H is northwest. FIG. 6I describes directions corresponding to each of sudden deceleration directions of FIGS. 6A to 6H.

FIG. 7 describes how to extract a plurality meshes located ahead.

FIG. 8 is a flowchart of driving support processing.

FIG. 9 is a flowchart of a navigation function.

DESCRIPTION OF THE PREFERRED EMBODIMENTS

Configuration of Navigation System

Figure 1:
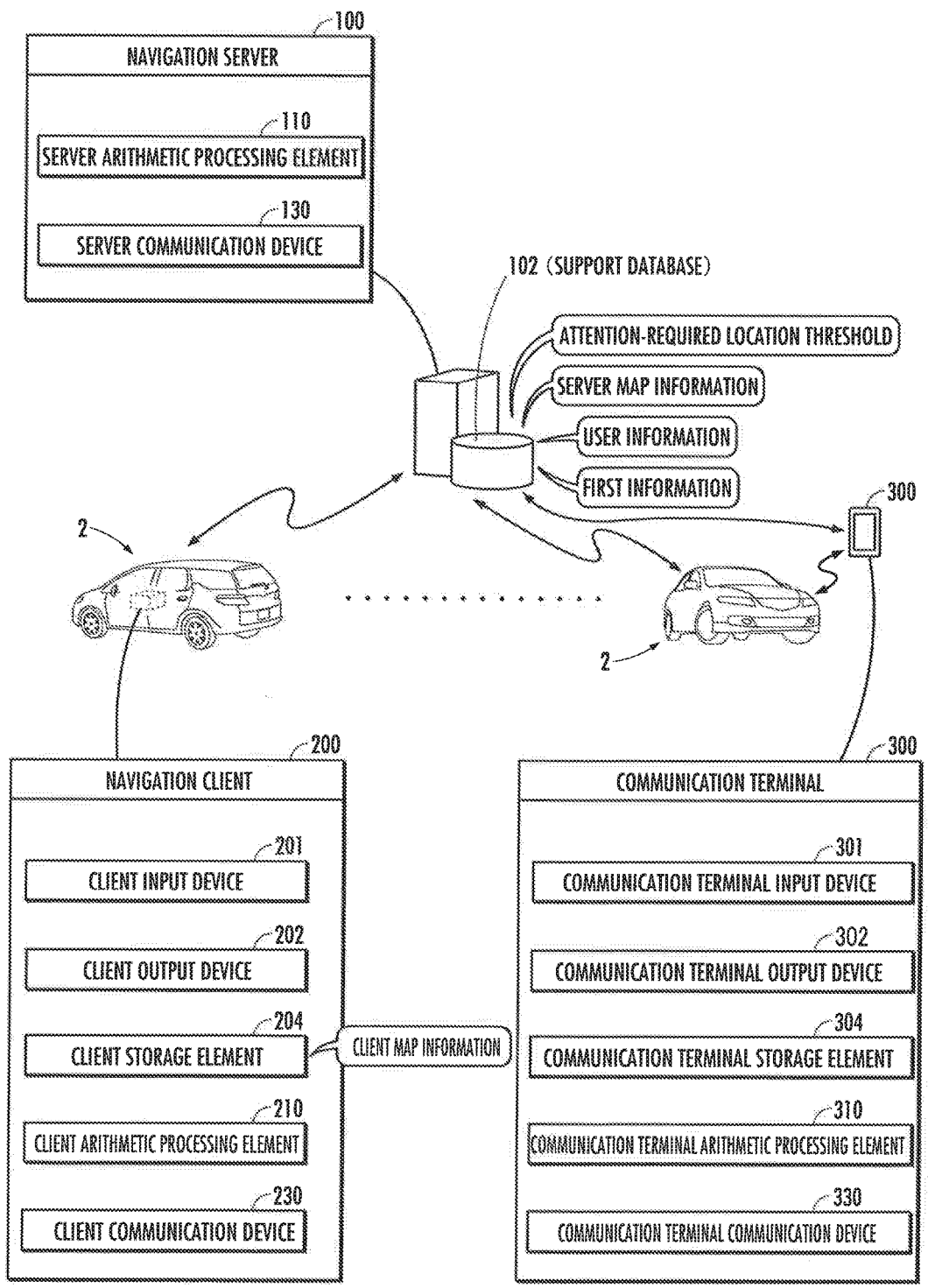
FIG. 1 is a schematic diagram illustrating the configuration of a navigation system of a present embodiment.

Referring to the drawings, the following describes embodiments of a navigation client, a navigation server and a navigation system of the present invention. Firstly, referring to FIG. 1, the configuration of the navigation system of the present invention is described below. The navigation system illustrated in FIG. 1 includes a navigation server 100, a navigation client 200 that is mounted on a user's vehicle (four-wheel automobile) 2 and a communication terminal 300.

Configuration of Navigation Server

The navigation server 100 is made up of one or a plurality of server computers (including a CPU, a ROM, a RAM, an I/O circuit, an A/D circuit and the like). The navigation server 100 includes a support database 102, a server arithmetic processing element (doubling as a server authentication arithmetic processing element) 110, and a server communication device 130.

The support database (server storage element) 102 saves or stores "user information" that is information specific to individual users, "first information", "server map information" representing dispositions of roads or links and meshes making up the roads, link cost and the like, and "attention-required location thresholds".

The "user information" is information specific to a user of each navigation client 200, and specifically is the information including a user identifier (user ID or the like) UID to specify the user of the navigation client 200, a user authentication code (a password, a public key, a session key or the like) Ukey to authenticate the user of the navigation client 200, a vehicle identifier (vehicle ID or the like) CID to specify a user's vehicle 2, and a cumulative value of evaluation values on the driving manner of the user of the navigation client 200 (evaluation cumulative value) TP, which are associated with each other and stored. The evaluation cumulative value TP is not limited to the evaluation value on the driving manner of a user, and it may be an evaluation value that is accumulated as the user uses the navigation client 200.

The "first information" is information specific to the user of the navigation client that the server authentication arithmetic processing element receives from the navigation client via the server communication device, and for instance, includes information that is set at the navigation client in the initial state (such as an identifier to identify the navigation client), information that is updated by an operator or the like during maintenance, and second information.

The "second information" is information that is collected by the navigation client or the user's vehicle during travelling or stopping of the user's vehicle, which may be information containing "driving history", for example.

The "driving history" is various types of information indicating the driving manner of the vehicle that is obtained based on a signal from a sensor provided in the navigation client 200 or from a communication between the navigation client 200 and the vehicle at the time of a navigation function described later, which specifically is information associating the vehicle identifier CID and driving data (positional information, travel route information, fuel consumption/power consumption information, temporal information, vehicle-speed information (vehicle speed, acceleration, deceleration, stopping time and the like)) FCD representing the driving manner of the vehicle.

The disposition manner of the "roads or links (meaning a road element connecting any two points on a road such as an intersection, a right-turn point, or a left-turn point) making up the roads" are represented by a group of points whose positions are specified by (latitude, longitude) or (latitude, longitude, height). The mesh is defined by line segments whose dispositions are defined by latitude and longitude. The link cost is information indicating a distance of a road segment corresponding to a link or time required to travel along a road segment. The server map information stored in the support database 102 can be updated as needed. The support database 102 may be configured by a database server that is separated from the navigation server 100.

The "attention-required location threshold" is a threshold relating to the extraction precision of an attention-required location that is to be noticed to the user as the attention-required location.

The server arithmetic processing element 110 is configured to execute driving support processing (see FIG. 8) to support the user in driving of the user's vehicle 2, attention-required location extracting processing (see FIG. 4) to create attention-seeking information including the attention-required location (e.g., an intersection where sudden braking manipulation occurs frequently) that needs attention-seeking when the user's vehicle 2 passes therethrough based on a travelling history of a plurality of vehicles, and service selection processing (see FIG. 14) to select a service that the user can use in accordance with the evaluation cumulative value of the user's driving manner.

For instance, the server arithmetic processing element 110 recognizes a current position (or a start position) P1 and a goal position P2 of the user's vehicle 2 via a communication with the navigation client 200. The server arithmetic processing element 110 searches for a server route R of the user's vehicle 2 connecting the current position P1 and the goal position P2 based on server map information stored in the support database 102. Then, the server arithmetic processing element 110 makes the navigation client 200 display the server route R via a communication with the navigation client 200.

The server arithmetic processing element 110 further creates navigation information NI to be transmitted to the navigation client 200 based on the vehicle identifier CID and the driving data FCD received via the server communication device 130. Then the server arithmetic processing element 110 compares an index value of the driving manner of the vehicle with the driving data FCD to determine a server evaluation value SP of the driving manner. The server arithmetic processing element 110 recognizes the user identifier UID corresponding to the vehicle identifier CID from the support database 102. Then the server arithmetic processing element 110 adds the server evaluation value SP to the evaluation cumulative value TP associated with the user identifier UID. The server arithmetic processing element 110 is configured to determine a service that the user corresponding to the user identifier UID can use in accordance with the evaluation cumulative value TP.

The server arithmetic processing element 110 is further configured to add a client evaluation value CP (described later) received via the server communication device 130 to the evaluation cumulative value TP corresponding to the vehicle identifier CID and store the same in the support database 102. The server arithmetic processing element 110 is configured to, when the navigation client 200 meets a first condition that an authentication code that the server communication device 130 recognizes is stored in the support database 102, permit the navigation client 200 to access the navigation server 100. The server arithmetic processing element 110 is further configured, when the navigation client meets a second condition that a predetermined duration has elapsed after the permission of the access, prohibit the navigation client from accessing the navigation server.

The server communication device 130 is configured to be connected to a public communication network (e.g., the Internet) and communicate with the navigation client 200 or the communication terminal 300. The server communication device 130 is configured to receive, from the navigation client 200, a vehicle identifier CID, driving data FCD, and a client evaluation value CP described later, and transmit navigation information NI, attention-seeking information and the like to an appropriate navigation client 200. The server communication device 130 is further configured to transmit a driving history confirmation page enabling viewing of the driving data FCD of the user to the navigation client 200 or the communication terminal 300.

The server communication device 130 is further configured to recognize an authentication code that is input to the navigation client 200 last time based on a communication with the navigation client 200.

The server communication device 130 is further configured to, based on a communication with a navigation client 200 that is permitted by the server arithmetic processing element 110 to access the navigation server 100, make the navigation client recognize the first information (including the driving data FCD) stored in the server storage element that is associated with user information. The server communication device 130 is configured to, based on a communication with a navigation client 200 that is prohibited by the server arithmetic processing element 110 from accessing the navigation server 100, make the navigation client 200 output a message urging to input a new authentication code.

Configuration of Navigation Client

The navigation client 200 is configured of an electronic control unit (ECU, including a CPU, a ROM, a RAM, an I/O and the like) as a hardware that is mounted on the user's vehicle 2. The navigation client 200 includes a client input device 201, a client output device 202, a client storage element (storage device) 204, a client arithmetic processing element 210, and a client communication device 230.

The client input device 201 is configured of an input switch or a microphone, for example, that is disposed at a center console or the like of the user's vehicle 2, and allows a user to input the goal position P2 or the like based on the manipulation manner by a user of the input switch or utterance from a user that is detected by the microphone.

The client input device (client input element) 201 is configured to enable inputting of a collection duration of the first information at the navigation client 200.

The client output device (client output element) 202 is made up of an image display device or a speaker, for example, that is disposed at a center console or the like of the user's vehicle 2, and outputs information in the form that a user can recognize it by seeing or hearing.

The client storage element 204 stores client map information or the like. The client map information indicates a disposition manner of roads or links, and this client map information is displayed on the image display device. Common link identification information is given to a link in the server map information and a link in the client map information.

The client arithmetic processing element 210 recognizes the current position P1 and the goal position P2 of the user's vehicle 2, and then makes the server arithmetic processing element 110 recognize them via a communication with the navigation server 100. The client arithmetic processing element 210 recognizes a server route R that the server arithmetic processing element 110 searches and causes the client output device 202 to output the same.

The client arithmetic processing element 210 further acquires the position, the vehicle speed, the acceleration, the deceleration and the like of the user's vehicle 2 from a GPS receiver (not illustrated) provided at the navigation client 200, a gyro-sensor (not illustrated) provided at the user's vehicle 2 or the like via a communication with the user's vehicle 2, and transmits the same to the navigation server 100 via the client communication device 230.

The client arithmetic processing element 210 is further configured to perform arithmetic processing that is required to execute functions such as a wire communication function, a Bluetooth® communication function, and a wireless packet communication function or the like.

The client arithmetic processing element 210 is configured to, based on attention-seeking information that is received via the client communication device 230, output an alarm to the client output device 202 when the user's vehicle 2 passes through an attention-required location.

When the user's vehicle 2 passes through the attention-required location, the client arithmetic processing element 210 compares an index value of the driving manner of the vehicle at the attention-required location and the driving data FCD indicating the driving manner of the user's vehicle 2 at the attention-required location, thus determining a client evaluation value CP. The client arithmetic processing element 210 outputs evaluation information (e.g., "Thank you for safety-driving") corresponding to the client evaluation value CP to the client output device 202.

The client arithmetic processing element 210 is further configured to record the driving data FCD in the navigation server 100 via a communication only during the collection duration designated by the user to the client input device 201, the driving data FCD indicating the driving manner of the user's vehicle 2 with the navigation client 200 mounted thereon.

The client arithmetic processing element 210 is configured to store the first information during the collection duration in the support database 102 in the form of enabling output to the client output device 202 and not to collect the first information other than during the collection duration, or to record the first information collected other than during the collection duration in the support database 102 in the form of disabling output to the client output device 202.

A method to store the information in the support database 102 in the form of enabling output to the client output device 202 includes to store the information in a database (client access enabling database), from which data is provided in response to a request from the navigation client 200, or to store that the data can be output using a flag or the like.

A method to store the information in the support database 102 in the form of disabling output to the client output device 202 includes to store the information in a database (client access disabling database), from which data is not provided in response to a request from the navigation client 200, or to store that the data cannot be output using a flag or the like.

The client communication device 230 is configured to be communicable with the server communication device 130 via the wireless packet communication or the Bluetooth communication function and via a mobile communication network or a public communication network. The client communication device 230 is configured to be communicable with a communication terminal communication device 330 that is brought into the vehicle or is present in the vicinity of the vehicle via the wire communication function or the Bluetooth communication function and via an in-vehicle communication network.

The client communication device 230 is configured to receive navigation information, and attention-seeking information and the like from the navigation server 100 to the navigation client 200, and to transmit a vehicle identifier CID, driving data FCD, a client evaluation value CP described later, and the like to the navigation server 100.

Configuration of Communication Terminal

The communication terminal 300 is configured of a personal computer, a mobile phone such as a smart phone or the like that is connected to a public communication network or a mobile communication network or the like. The communication terminal 300 includes a communication terminal input device 301, a communication terminal output device 302, a communication terminal storage element 304, a communication terminal arithmetic processing element 310 and a communication terminal communication device 330.

The communication terminal input device 301 is configured of a keyboard, a mouse, a tablet, a microphone or the like, for example, and is configured to enable WEB viewing, mail transmission/reception and the like in response to an input manner with a keyboard by a user, a manipulation manner of the mouse or the tablet, or utterance that is detected by the microphone.

The communication terminal output device 302 is configured of an image display device, a speaker or the like that partially makes up the communication terminal 300, and outputs information in a form recognizable via seeing or hearing.

The communication terminal storage element 304 is configured of a RAM, a ROM, an I/O or the like, and stores information necessary to access the navigation server 100, such as a user identifier UID or the like.

The communication terminal arithmetic processing element 310 is configured to perform arithmetic processing necessary to execute functions such as WEB viewing, mail transmission/reception, a wire communication function, a Bluetooth communication function and a wire packet communication function.

The communication terminal communication device 330 is configured to be communicable with the server communication device 130 via a wireless packet communication function or a Bluetooth communication function and via a mobile communication network or a public communication network or the like. The communication terminal communication device 330 is configured to be communicable with the client communication device 230 via a wire communication function or a Bluetooth communication function and via an in-vehicle communication network.

Overall Function

Figure 2:
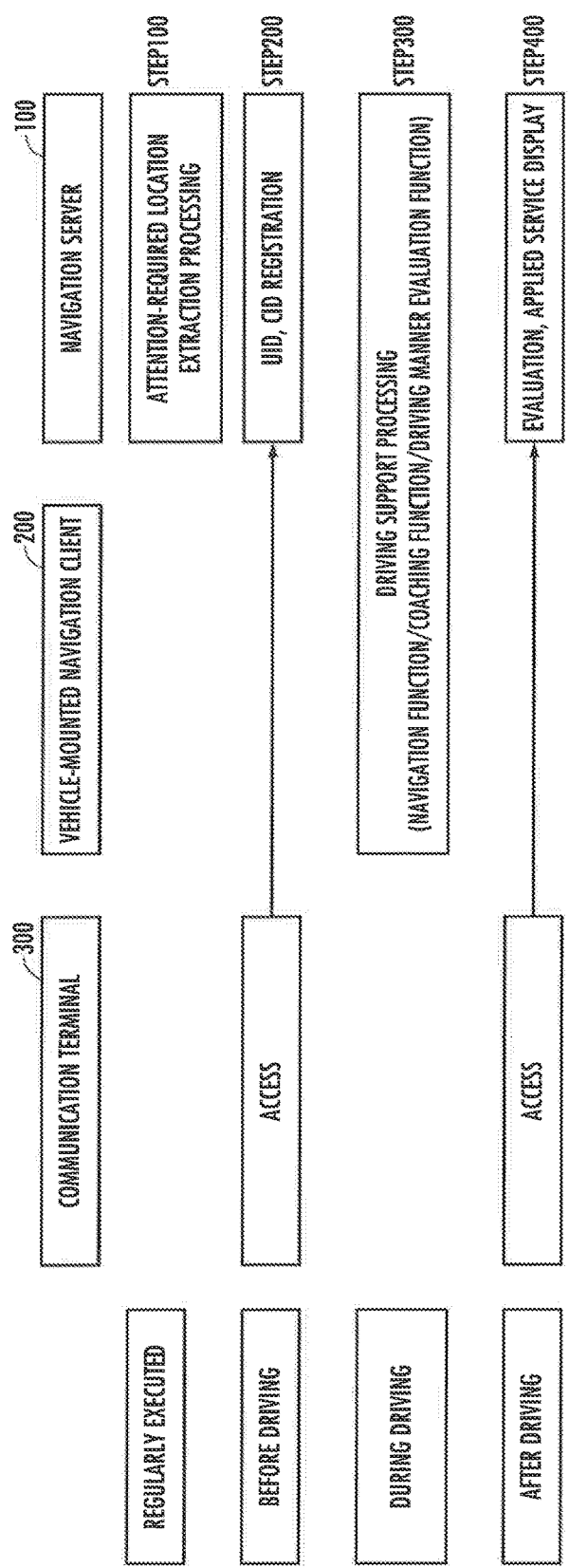
FIG. 2 is a flowchart to describe functions of the navigation system of the present embodiment.

Referring to FIG. 2, the following roughly describes the overall function of the navigation system of the present embodiment.

The navigation server 100 regularly executes, as preparation processing of a coaching function and a driving manner evaluation function described later, the attention-required location extraction processing to extract an attention-required location to be used for the coaching function and the driving manner evaluation function (FIG. 2/STEP 100).

A user accesses the navigation server 100 using the communication terminal 300 at any timing before drive starting, and registers the user identifier UID and the vehicle identifier CID (FIG. 2/STEP 200). The navigation server 100 associates the user identifier UID and the vehicle identifier CID and stores the same in the support database 102.

While the user drives the user's vehicle 2, driving support processing such as a navigation function, a coaching function and a driving manner evaluation function described later is executed via a mutual communication between the navigation server 100 and the navigation client 200 (FIG. 2/STEP 300).

After finishing the driving of the user's vehicle 2, the user accesses the navigation server 100 via the communication terminal 300, whereby the user is allowed to view a drive history confirmation page as illustrated in FIG. 3A (FIG. 2/STEP 400). The drive history confirmation page includes a display field SC1 of user information including a user name, a user identifier, a vehicle identifier, a vehicle manufacturer, a vehicle type, a vehicle number and the like, a display field SC2 of evaluation and advice on the driving manner, a display field SC3 of a first evaluation mark (e.g., a face mark) corresponding to the evaluation of the user's driving manner, a display field SC4 of an evaluation cumulative value of the driving manner, a display field SC5 of the evaluation value of the driving manner during the driving last time, a display field SC6 of an available service, and the like. The drive history confirmation page further includes, as shown in FIG. 3B, a past driving history confirmation page, including past driving history pr0 that is overlapped on a map. This past driving history confirmation page may include second evaluation marks (e.g., face marks) pr1 to pr4 corresponding to the evaluations of the driving manner at each of the locations. The first evaluation mark SC3 and the second evaluation marks pr1 to pr4 are smile-face marks when the evaluation values are better than the index value, and are crying-face marks when the evaluation value is worse than the index value. Preferably, these marks are defined by the same or corresponding standards, and the same marks are used.

Attention-Required Location Extraction Processing

Referring to FIGS. 4 to 7, the following describes the attention-required location extraction processing described at FIG. 2/STEP 100. The following describes, as one embodiment of the attention-required location extraction, processing to extract an intersection where sudden braking manipulation occurs frequently.

Figure 4:
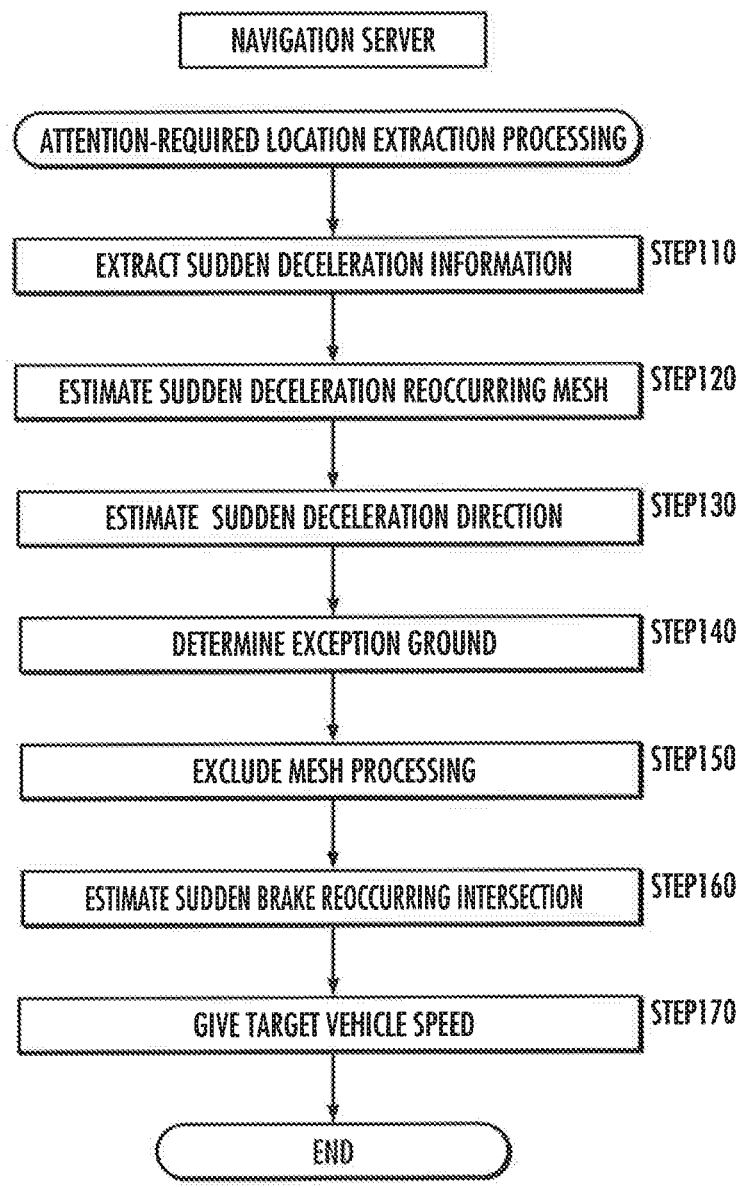
FIG. 4 is a flowchart of attention-required location extraction processing.

Firstly, the server arithmetic processing element 110 reads driving data of all users from the support database 102, and extracts, from the driving date, sudden deceleration information including a position where a sudden deceleration phenomenon occurred, corresponding to a predetermined condition (e.g., deceleration included in vehicle information that is a first threshold or more), and the travelling direction of the vehicle when such a sudden deceleration phenomenon occurred (FIG. 4/STEP 110). The first threshold is stored in the support database 102 as an "attention-required location threshold".

Figure 5:
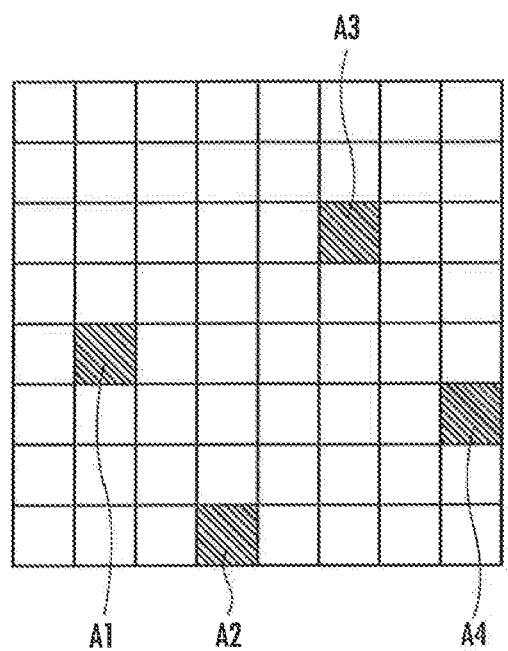
FIG. 5 describes how to extract meshes with a lot of sudden deceleration manipulations to extract an attention-required location.

As illustrated in FIG. 5, the server arithmetic processing element 110 calculates a sudden deceleration possibility based on the number of passing cars and the number of sudden deceleration cases for each mesh included in the server map information, and estimates meshes A1, A2, A3 and A4 having the sudden deceleration possibility that are a second threshold (e.g., 50%) or more as sudden deceleration reoccurring mesh (FIG. 4/STEP 120). The second threshold is stored in the support database 102 as an "attention-required location threshold".

As illustrated in FIGS. 6A to H, the server arithmetic processing element 110 estimates a sudden deceleration direction where the deceleration phenomenon occurred most frequently among eight directions including north, northeast, east, southeast, south, southwest, west and northwest, for example, at the estimated sudden deceleration reoccurring meshes (FIG. 4/STEP 130). Herein, the directions (north a, northeast b, east c, southeast d, south e, southwest f, west g, northwest h) in FIG. 6I and sudden deceleration directions H1 to H8 at plural meshes M1 to M8 located ahead in FIGS. 6A to H correspond to each other.

The server arithmetic processing element 110 determines whether there is an exception ground (e.g., it is an intersection having a traffic light) or not based on the sudden deceleration directions of the sudden deceleration reoccurring meshes (FIG. 4/STEP 140). An intersection having a traffic light can be obtained by referring to traffic-light information that is stored in the server map information. The server arithmetic processing element 110 excludes a sudden deceleration reoccurring mesh determined as including an exception ground from the target of the following processing (FIG. 4/STEP 150).

As illustrated in FIG. 7, with respect to a sudden deceleration reoccurring mesh TM as the processing target (free from the exception ground), the server arithmetic processing element 110 estimates, among a plurality of meshes (e.g., nine meshes) FM located ahead in the sudden deceleration direction, an intersection that is the closet from the center position of a plurality of meshes located ahead where the sudden deceleration reoccurring mesh exists as a sudden brake manipulation reoccurring intersection, and extracts coordinates of the position at the sudden brake manipulation reoccurring intersection (FIG. 4/STEP 160).

The server arithmetic processing element 110 refers to driving data of all users from the support database 102, calculates the average vehicle speed at the sudden brake manipulation reoccurring point, and based on the average vehicle speed gives a target vehicle speed to the sudden brake manipulation reoccurring intersection when travelling the sudden brake manipulation reoccurring intersection (FIG. 4 STEP 170).

Driving Support Processing

Referring to FIG. 8, the following describes the driving support processing at FIG. 2/STEP 300 in details. This processing is to support a user who is driving the user's vehicle 2 via a mutual communication between the navigation server 100 and the navigation client 200 that is activated in response to ON of an ignition switch of the user's vehicle 2, and includes navigation processing, coaching processing, driving manner evaluation processing and the like.

Firstly, the following describes this processing roughly. When the power source of the navigation client 200 is turned ON (FIG. 8/STEP 310), start processing such as access request and access acceptance or the like is performed via a mutual communication between the navigation client 200 and the navigation server 100 (FIG. 8/STEP 320). Then the navigation client 200 performs during-driving processing to support user's driving such as navigation, coaching and driving manner evaluation based on information received from the navigation server 100 (FIG. 8/STEP 340). Then, after driving, the navigation server 100 performs end processing such as to evaluate the driving of the user based on the information received from the navigation client 200 (FIG. 8/STEP 360).

The following describes the driving support processing in more details.

When the power source of the navigation client 200 is turned ON (FIG. 8/STEP 310), the client arithmetic processing element 210 refers to the driving history last time that is stored in the client storage element 204 to determine whether this is the first driving in one day or not (FIG. 8/STEP 321). When the determination result is affirmative (FIG. 8/STEP 321 . . . YES), the client arithmetic processing element 210 outputs the evaluation of the driving manner last time, a welcome message ("Have a safe drive again", for example) and the like to the client output device 202 (FIG. 8/STEP 322).

When the determination result is negative (FIG. 8/STEP 321 . . . NO) or after the processing at STEP 322, the client arithmetic processing element 210 refers to setting stored in the client storage element 204, and determines whether automatic start setting of the navigation function, the coaching function and the driving manner evaluation function is ON or not (FIG. 8/STEP 323).

When the determination result is negative (FIG. 8/STEP 323 . . . NO), the client arithmetic processing element 210 outputs, to the client output device 202, a selection screen to allow a user to select whether the navigation function, the coaching function and the driving manner evaluation function are used or not (not illustrated). When the user selects not to use the navigation function and the like, the client arithmetic processing element 210 does not execute the navigation function and the like and ends (not illustrated).

When the user selects to use the navigation function and the like, the client arithmetic processing element 210 outputs, as illustrated in FIG. 3C, input boxes (SC7 and 8) of user information including the user identifier UID, the user authentication code Ukey and the like and an input box (SC9) of the collection duration of the second information such as driving history to the client output device 202 (FIG. 8/STEP 324). As illustrated in FIG. 3D, the client arithmetic processing element 210 may be configured to display a registration information input screen to register user information, including an input box SC10 of a user name, an input box SC11 of a user identifier, information SC12 of the user's vehicle 2, an input box SC13 of a user authentication code and the like. In this case, the client arithmetic processing element 210 may acquire information on the user's vehicle 2, which may be the vehicle identifier CID via a communication with the user's vehicle 2, and may be the manufacturer, the vehicle type, the vehicle number and the like based on the vehicle identifier CID via a communication with the navigation server 100, and may output such information to the client output device 202.

After FIG. 8/STEP 324, the client arithmetic processing element 210 transmits the input user information and collection duration to the navigation server 100 via the client communication device 230 (FIG. 8/STEP 325).

The server arithmetic processing element 110 determines whether the navigation client 200 meets the first condition or not concerning that the user authentication code Ukey included in the user authentication information received via the server communication device 130 is stored in the support database 102 (FIG. 8/STEP 326).

When the determination result is affirmative (FIG. 8/STEP 326 . . . YES), the server arithmetic processing element 110 records the authentication date and time of the user identifier UID, and notifies the navigation client 200 of the acceptance of the access to the navigation function, the coaching function and the driving manner evaluation function via the server communication device 130 (FIG. 8/STEP 327). Receiving this notification, the client arithmetic processing element 210 turns ON the automatic starting setting of the navigation function, the coaching function and the driving manner evaluation function, to omit authentication for the access next time and later.

When the determination result is negative (FIG. 8/STEP 326 . . . NO), the server arithmetic processing element 110 notifies the navigation client 200 of prohibition of access to the navigation server 100 via the server communication device 130. Receiving this notification, the client arithmetic processing element 210 outputs the prohibition of access to the navigation server 100 to the client output device 202, and ends the start processing (FIG. 8/STEP 328). The client arithmetic processing element 210 may not end the start processing and output the user information input screen (see FIG. 3C) again to the client output device 202.

When the automatic starting setting of the navigation function, the coaching function and the driving manner evaluation function is ON (FIG. 8/STEP 323 . . . YES), the client arithmetic processing element 210 does not output the user information input screen, and transmits an access request for the navigation function, the coaching function and the driving manner evaluation function as well as the user identifier UID to the navigation server 100 via the client communication device 230. Receiving this access request via the server communication device 130, the server arithmetic processing element 110 determines whether the navigation client 200 meets the second condition that is determined from the past communication contents with the navigation client 200 (FIG. 8/STEP 329).

The second condition may be a condition that a parking position where the user's vehicle 2 was parked most frequently or for the longest time, which is shown in the driving data received from the navigation client 200 during a predetermined first duration, and a parking position where the user's vehicle 2 was parked most frequently or for the longest time, which is shown in the driving data received from the navigation client 200 during a predetermined second duration that is different form the first duration, are different. For instance, when the position where the user's vehicle 2 was parked most frequently (e.g., the place where the power source of the navigation client 200 was turned ON/OFF frequently) that is received from the navigation client 200 in the past seven days and the position where the user's vehicle 2 was parked most frequently that is received from the navigation client 200 eight to twenty-eight days ago are different, there is a possibility that the owner of the user's vehicle 2 (the navigation client 200) may be changed.

Alternatively, the second condition may be a condition that at a plurality of parking positions where the user's vehicle was parked frequently or for a long time among parking positions of the user's vehicle 2 that are shown in the driving data received from the navigation client 200 during a predetermined third duration, the user's vehicle 2 was not parked during a predetermined fourth duration. For instance, when the user's vehicle 2 was parked at parking positions of L1 (home), L2 (working place) and L3 (leisure land) frequently among the parking positions which is received from the navigation client 200 during the past one year, and if the user's vehicle 2 was not parked at any one of the positions L1 to L3 which is received from the navigation client 200 during the past one month, there is a possibility that the owner of the user's vehicle 2 (or the navigation client 200) may be changed.

Herein, the place where the power source of the navigation client 200 is turned ON is measured as the parking position of the user's vehicle 2, for example, and the duration from the turning-OFF of the power source to turning-ON is measured as the parking duration of the user's vehicle 2. In the case where the navigation client 200 is disconnected from the user's vehicle 2 and is carried out, the place where the physical or electrical connection between the navigation client 200 and the vehicle 2 is cancelled (or connected) is measured as the parking position of the user's vehicle 2, and the duration until they are connected again is measured as the parking duration of the user's vehicle 2. A specific place may be stored as the parking position of the user's vehicle 2 through an operation of the user, or the duration in which the vehicle did not move from the parking position may be measured as the parking duration of the user's vehicle 2.

The second condition may be a condition including at least one of the condition that a predetermined fifth duration (e.g., one month) has passed since the authentication date and time last time of the user identifier UID (e.g., the date and time of YES at FIG. 8/STEP 326 last time), which is based on a communication with the navigation client 200, and the condition that a predetermined sixth duration (e.g., one week) has passed since the access date and time (the date and time when FIG. 8/STEP 327 was executed last time) to the navigation server 100 by the navigation client 200 last time. The first to the sixth durations used may be a duration when there is a high possibility that the owner of the navigation client 200 is changed, which is specified by a test or by data collected from each vehicle (e.g., the duration when there is a possibility of 1% or higher that the navigation client is changed, which is based on the data collected from each vehicle).

When the determination result is negative (FIG. 8/STEP 329 . . . NO), the server arithmetic processing element 110 does not request the input of user information, and after the processing at STEP 330 to STEP 332, stores the access date and time in the support database 102. Then the server arithmetic processing element 110 notifies the navigation client 200 of the acceptance of the access to the navigation function, the coaching function and the driving manner evaluation function (FIG. 8/STEP 327). In this case, even during the duration when the second condition is not met, the server arithmetic processing element 110 transmits a message to urge the input of the user authentication code Ukey to the navigation client 200 via the server communication device 130 (FIG. 8/STEP 330), and when receiving the user authentication code Ukey from the navigation client 200 (FIG. 8/STEP 331 . . . YES), adds a special evaluation value EP to the evaluation cumulative value TP, and stores the same in the support database 102 (FIG. 8/STEP 332).

When the determination result is affirmative at STEP 329 (FIG. 8/STEP 329 . . . YES), the server arithmetic processing element 110 transmits a message to request the input of user information to the navigation client 200 via the server communication device 130. Receiving the message via the client communication device 230, the client arithmetic processing element 210 turns OFF the automatic start setting of the navigation function, the coaching function and the driving manner evaluation function, and performs the processing of FIG. 8/STEP 324 and later.

Following the access acceptance notification processing (FIG. 8/STEP 327), the navigation client 200 and the navigation server 100 execute the navigation processing (FIG. 8/STEP 341) and the coaching/driving evaluation processing (FIG. 8/STEP 342) via a mutual communication.

When the navigation processing ends because the vehicle reaches the goal position, for example, the client arithmetic processing element 210 transmits the vehicle identifier CID and the driving data FCD as well as the client evaluation value CP that is determined at the coaching/driving evaluation processing to the navigation server 100 via the client communication device 230 (FIG. 8/STEP 361).

The server arithmetic processing element 110 compares the index value of the vehicle driving manner and the received driving data FCD, thus determining a sever evaluation value SP that is the evaluation value of the driving manner of the user's vehicle 2. The server arithmetic processing element 110 adds the server evaluation value SP and the received client evaluation value CP to the evaluation cumulative value TP corresponding to the vehicle identifier CID, and stores the same in the support database 102 (FIG. 8/STEP 362).

The server arithmetic processing element 110 selects a service that the user can use in accordance with the evaluation cumulative value TP, and notifies the navigation client 200 of service information via the server communication device 130 (FIG. 8/STEP 363).

Based on the service information noticed, the client arithmetic processing element 210 outputs a display field SC14 of access information such as a message, an image or voice or the like that guides to an access to the necessary navigation server 100 to check the evaluation value and the available service as illustrated in FIG. 3E (FIG. 8/STEP 364). The access information is information on the location of the evaluation cumulative value TP such as a HTTP address, information to transmit an acquisition request of the evaluation cumulative value TP such as a Mail address, information on how to acquire the evaluation cumulative value TP by using an application or the like, for example, to which a terminal (e.g., a communication terminal 300) other than the navigation client 200 that outputs the access information also can use.

When such a series of the processing ends, the driving support processing ends.

Navigation Function

Figure 10:
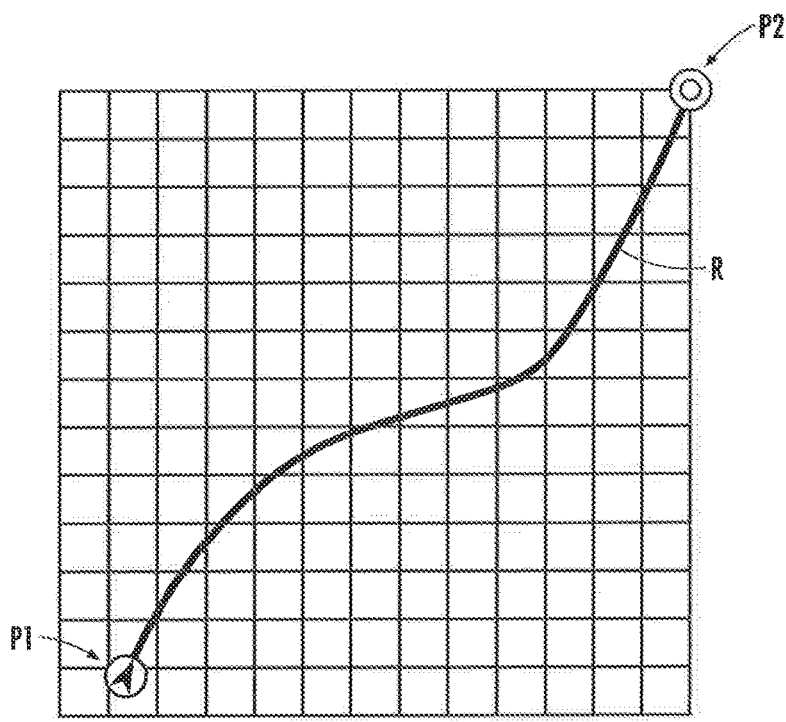
FIG. 10A and FIG. 10B describe a server route.
Figure 10:
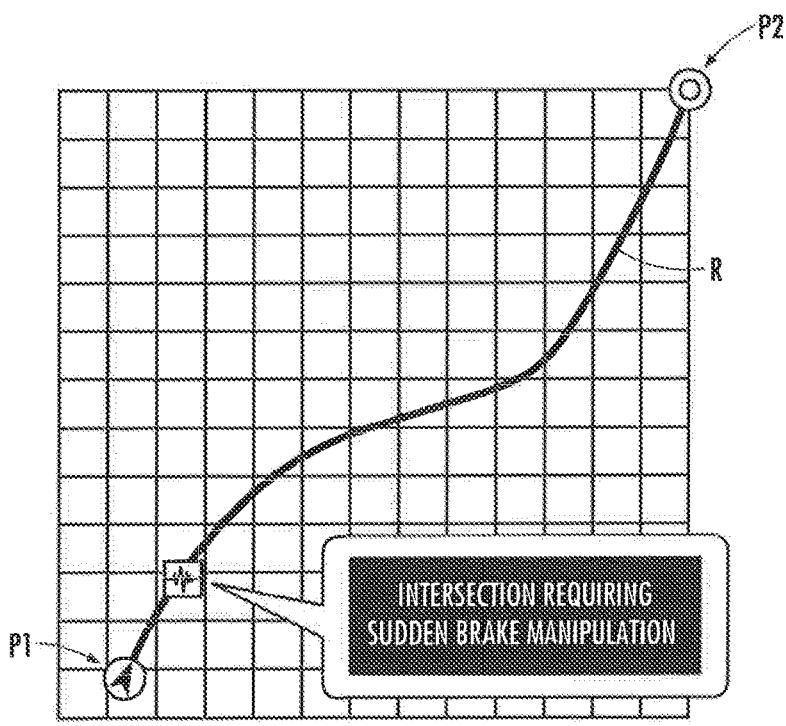

Referring to FIG. 9 and FIG. 10, the navigation function at FIG. 8/STEP 341 is described below. This function is executed mainly during driving via a mutual communication between the navigation server 100 and the navigation client 200. During a communication between the navigation server 100 and the navigation client 200, a vehicle identifier CID to identify the navigation client 200 or the user's vehicle 2 is additionally transmitted/received, whereby the navigation client 200 as a source or a destination of the transmission can be identified.

Firstly, the client arithmetic processing element 210 of the navigation client 200 recognizes the current position P1 and the goal position P2 of the user's vehicle 2 (FIG. 9/STEP 3411, STEP 3412). The current position P1 of the user's vehicle 2 is measured based on a GPS signal received by a GPS receiver of the navigation client 200 or an output signal of a gyro sensor corresponding to the direction or the travelling direction of the user's vehicle 2, for example. The goal position P2 of the user's vehicle 2 is recognized based on a manipulation manner by a user of a button configuring the client input device 201 or the contents of vice or utterance of a user that is detected by a microphone. Then the client arithmetic processing element 210 transmits data indicating the current position P1 and the goal position P2 (at the time of input of the goal position P2) of the user's vehicle 2 from the navigation client 200 to the navigation server 100.

The server arithmetic processing element 110 of the navigation server 100 recognizes the current position P1 and the goal position P2 of the user's vehicle 2 (FIG. 9/STEP 3413), and reads server map information from the support database 102, and then searches for one or a plurality of server routes R connecting the current position P1 and the goal position P2 (FIG. 9/STEP 3414). Thereby, as illustrated in FIG. 10A, for example, a server route R connecting the current position P1 and the goal position P2 of the user's vehicle 2 is searched. One or a plurality of routes having an expected short travelling duration or travelling distance of the user's vehicle 2, or one or a plurality of routes having expected good fuel efficiency of the user's vehicle 2 can be preferentially searched. The server arithmetic processing element 110 then reads traffic information distributed from a traffic information center such as the VICS® center to the navigation server 100 and floating car data (FCD representing a time-variable mode of the position of a floating car, or in addition to this, fuel consumption of a floating car) collected from the floating cars, from the support database 102, which is then used as the basis of search for the server route R. Receiving the server route R, the client arithmetic processing element 210 of the navigation client 200 displays the server route R at the client output device 202 as illustrated in FIG. 10B (FIG. 9/STEP 3415). Instead of the server route R, a client route r (not illustrated) that is searched by the client arithmetic processing element 210 based on the server route R may be displayed at the client output device 202.

The navigation client 200 transmits the driving data FCD of the user's vehicle 2 to the navigation server 100 at any time, and the navigation server 100 creates navigation information NI (e.g., information including a server route that is searched again by updating the current position) including a server route R based on the received driving data FCD and provides the same to the navigation client 200, whereby the client arithmetic processing element 210 updates the display at the client output device 202 as needed.

When a user designates the collection duration via the client input device 201, the driving data FCD may be accumulated for the designated collection duration (e.g., 12 hours) only from the start of driving.

Coaching Function

Figure 11:
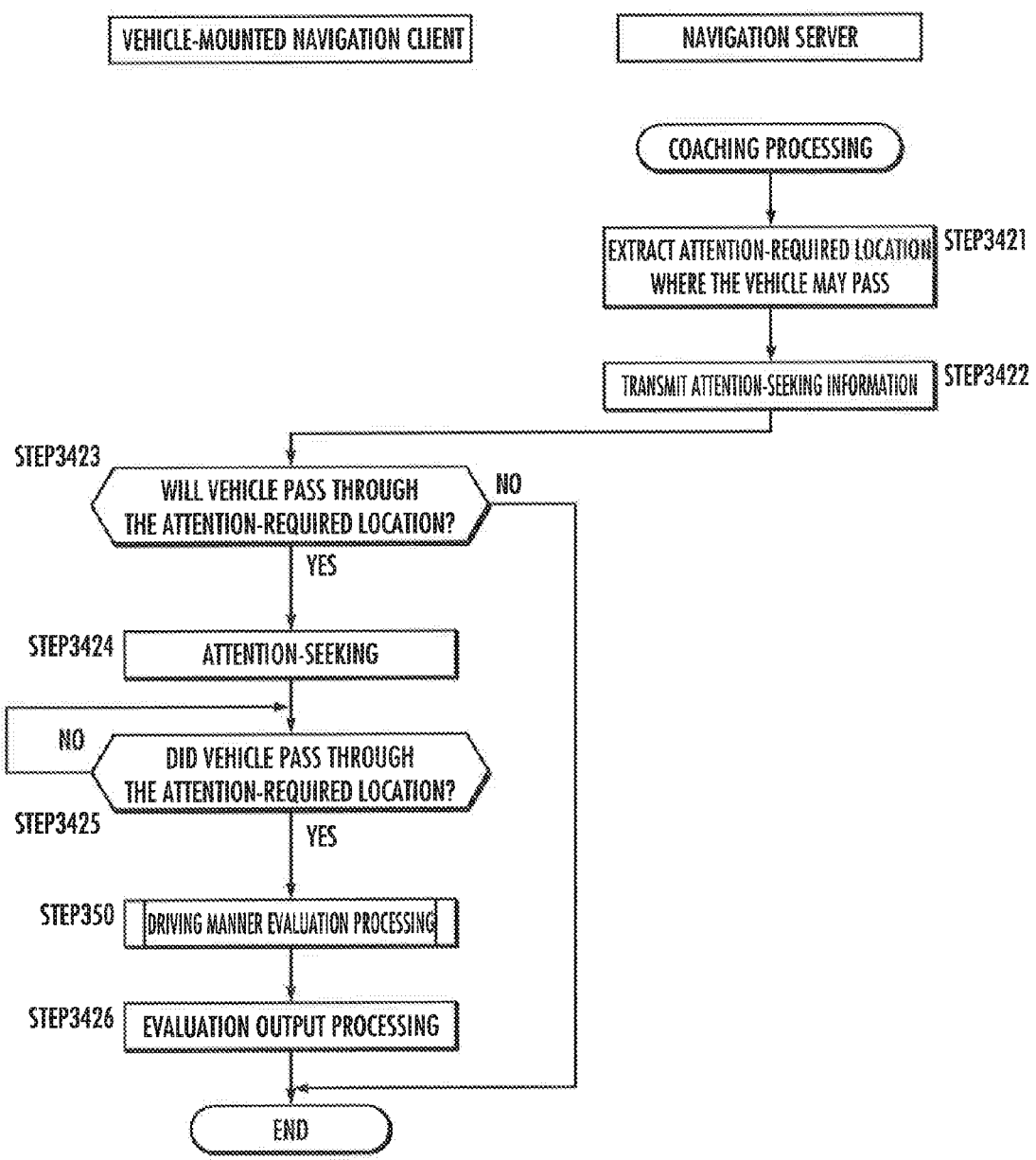
FIG. 11 is a flowchart of coaching processing.

Referring to FIG. 11, the coaching processing of FIG. 8/STEP 342 is described below. This processing is executed, similar to the navigation processing, mainly during driving via a mutual communication between the navigation server 100 and the navigation client 200 concurrently with the navigation processing.

Firstly, the server arithmetic processing element 110 extracts an attention-required location that the user's vehicle 2 may pass through among the attention-required locations extracted at the attention-required location extraction processing, based on the driving data FCD received from the navigation client 200 at any time (FIG. 11/STEP 3421). Specifically the server arithmetic processing element 110 extracts, as a first attention-required location, an attention-required location that is located within a predetermined distance (e.g., 10 km) range about the current location of the user's vehicle 2 as a center that is specified from the driving data FCD. Then the server arithmetic processing element 110 extracts, as a second attention-required location, from the first attention-required location, an attention-required location that is located within a predetermined angular range about the travelling direction of the vehicle that is specified from the driving data FCD as a center. The server arithmetic processing element 110 extracts a link from the server map information, and extracts, as a third attention-required location, an attention-required location that can be reached by passing a link within a predetermined angular range from the current position of the vehicle among the second attention-required locations. The server arithmetic processing element 110 extracts, as a fourth attention-required location, an attention-required location on the server route R among the third attention-required locations. The processing to extract the first to the third attention-required locations may be omitted.

The server arithmetic processing element 110 transmits the extracted attention-required location (the fourth attention-required location) and attention-seeking information including a target vehicle speed given to the attention-required location to the navigation client 200 via the server communication device 130 (FIG. 11/STEP 3422).

Based on the attention-required location included in the attention-seeking information that is received via the client communication device 230, the client arithmetic processing element 210 determines whether the user's vehicle 2 passes through the attention-required location or not (FIG. 11/STEP 3423). Specifically the client arithmetic processing element 210 compares the current location of the user's vehicle 2 and the position of the attention-required location to check whether such attention-required location exists or not within a range of a predetermined distance (e.g., 1 km) from the user's vehicle 2. When the attention-required location exists within the range of the predetermined distance from the user's vehicle 2, the client arithmetic processing element 210 determines whether the attention-required location exists within a predetermined angle from the travelling direction of the user's vehicle 2. When the attention-required location exists in the travelling direction of the user's vehicle 2, the client arithmetic processing element 210 determines whether the link where the user's vehicle 2 currently travels is adjacent to the attention-required location or not. The client arithmetic processing element 210 further checks whether or not the attention-required location is on the server route R. When the results of all of these determinations are affirmative, it is determined that there is a possibility that the user's vehicle 2 passes through the attention-required location. When the result of any one of these determinations is negative, it is determined that the user's vehicle 2 will not pass through the attention-required location. When the determination result is negative (FIG. 11/STEP 3423 . . . NO), the client arithmetic processing element 210 ends this processing.

Figure 12:
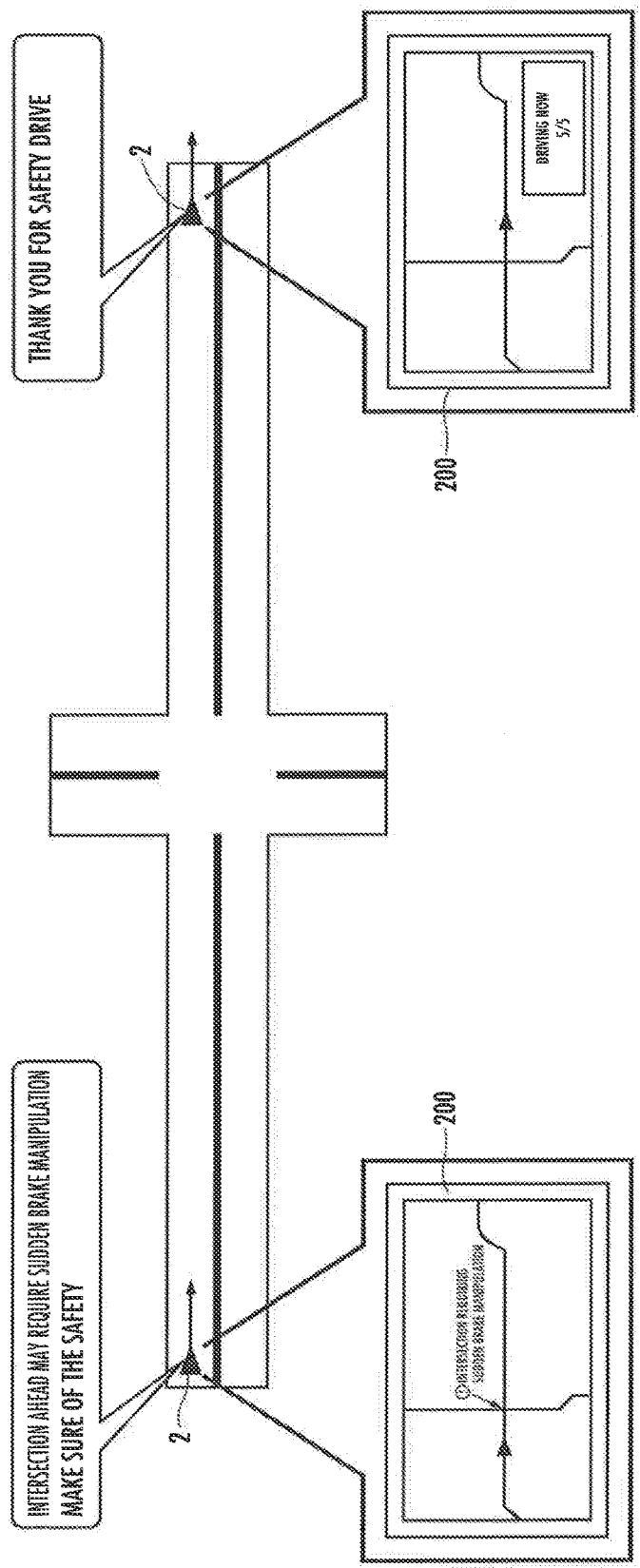
FIG. 12 is a flowchart of coaching processing at an intersection requiring a stop.

When the determination result is affirmative (FIG. 11/STEP 3423 . . . YES), the client arithmetic processing element 210 outputs an attention-seeking message at the client output device 202 (FIG. 11/STEP 3424). For instance, as illustrated in FIG. 12, the client arithmetic processing element 210 outputs a message such as "Intersection ahead may require a sudden brake manipulation. Make sure of the safety" from a speaker as voice, and displays a mark (e.g., the figure of an exclamation mark surrounded with a circle) indicating the attention-required location on the server route displayed on the image output device.

Following FIG. 11/STEP 3424, the client arithmetic processing element 210 determines whether the vehicle has passed over the attention-required location or not (FIG. 11/STEP 3425). Determination as to whether the vehicle has passed over the attention-required location or not is made based on the current position and the travelling direction of the user's vehicle 2 and the driving data FCD of the user's vehicle 2.

When the determination result is affirmative (FIG. 11/STEP 3425 . . . YES), the client arithmetic processing element 210 compares the target velocity speed at the attention-required location that is received from the navigation server 100 as an index value with the driving data FCD of the user's vehicle 2 at the attention-required location, thus evaluating the driving manner of the user's vehicle 2 at the attention-required location (FIG. 11/STEP. 350).

As illustrated in FIG. 12, the client arithmetic processing element 210 outputs the evaluation of the driving manner to the client output device 202 (FIG. 11/STEP 3426). For instance, when the evaluation value of the driving manner is high (the degree of difference from the index value is small), a message of "thank you for safety drive" is output from the speaker of the client output device 202, and the image display device of the client output device 202 displays the score corresponding to the driving manner. When the evaluation value of the driving manner is low (the degree of difference from the index value is large), an alarm to urge safety drive is output at the client output device 202 such as the speaker.

Driving Manner Evaluation Function at Attention-Required Location

Figure 13:
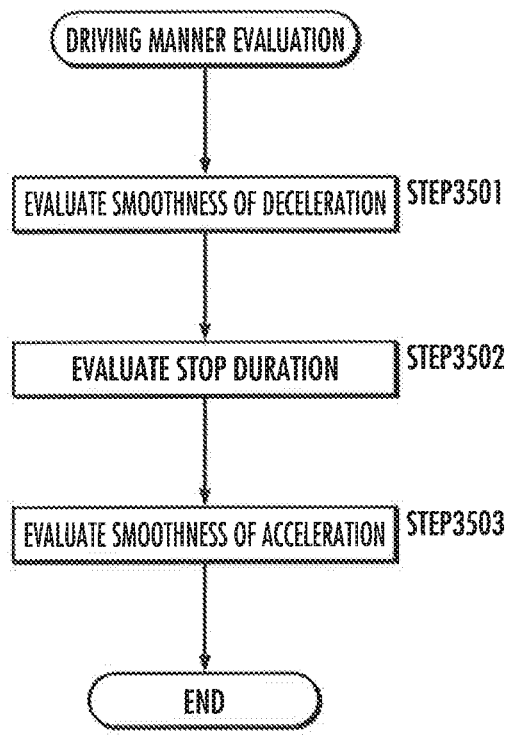
FIG. 13 is a flowchart of a driving evaluation function.

Referring to FIG. 13, the driving evaluation processing at FIG. 11/STEP 350, which is performed when a vehicle passes through an intersection requiring a stop as an attention-requiring location, is described below. This processing is executed by the navigation client 200 in the coaching processing.

Firstly, the client arithmetic processing element 210 evaluates whether deceleration is performed smoothly or not till an attention-required location (FIG. 13/STEP 3501). Specifically, based on a signal indicating a vehicle speed, acceleration, and deceleration output from a gyro sensor or the like, the client arithmetic processing element 210 determines whether the deceleration is predetermined deceleration (e.g., 0.15G) or less. The client arithmetic processing element 210 then calculates an average value and dispersion of the deceleration, and determines whether or not there is any deceleration greatly exceeding the average. An evaluation value having more affirmative determinations among these determinations is determined higher, and an evaluation value having more negative determinations is determined lower.

Then the client arithmetic processing element 210 evaluates whether the stop duration is a predetermined duration or longer (FIG. 13/STEP 3502). Specifically, based on a signal indicating a vehicle speed, acceleration, and deceleration output from a gyro sensor or the like, the client arithmetic processing element 210 determines whether or not the vehicle speed is a predetermined vehicle speed (e.g., 4 km/hour) or less. The client arithmetic processing element 210 then determines whether or not the duration when the vehicle speed is the predetermined vehicle speed or less is equal to or more than a predetermined duration (e.g., 2 seconds or more and 4 seconds or less). An evaluation value having more affirmative determinations among these determinations is determined higher, and having more negative determinations is determined lower.

Then the client arithmetic processing element 210 evaluates whether or not acceleration after passing through the attention-required location is performed smoothly or not (FIG. 13/STEP 3503). Specifically, based on a signal indicating a vehicle speed, acceleration, and deceleration output from a gyro sensor or the like, the client arithmetic processing element 210 determines whether the acceleration is predetermined acceleration (e.g., 0.15 G) or less. The client arithmetic processing element 210 then calculates an average value and dispersion of the acceleration, and determines whether or not there is any acceleration greatly exceeding the average. An evaluation value having more affirmative determinations among these determinations is determined higher, and having more negative determinations is determined lower.

Service Selection Function

Figure 14:
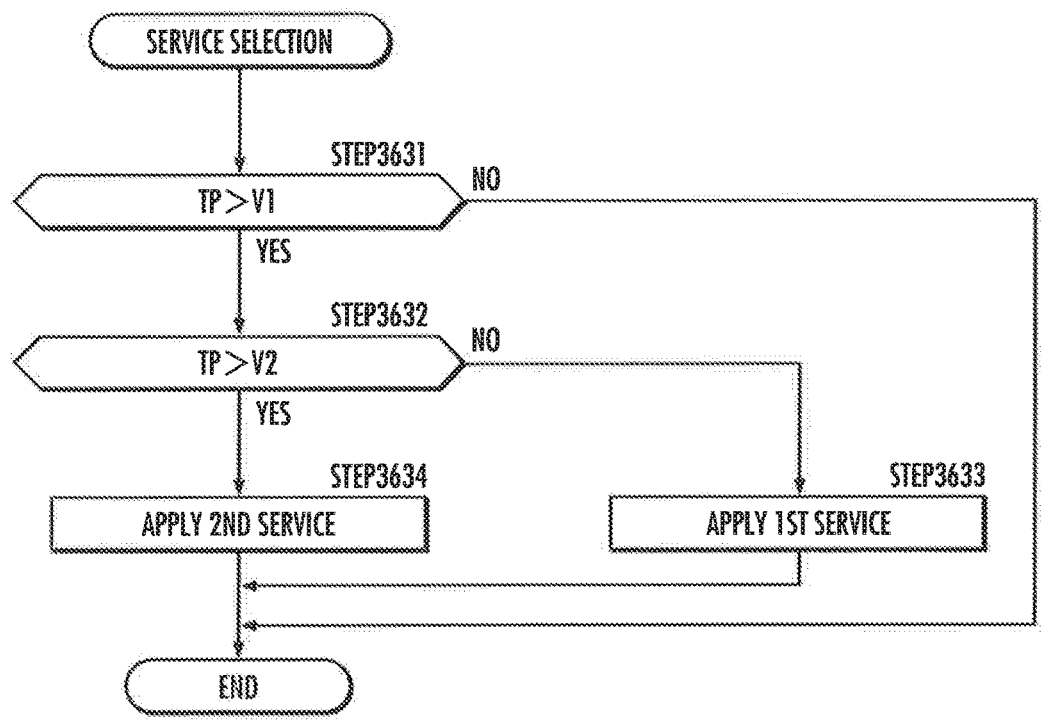
FIG. 14 is a flowchart to select a service.

Referring to FIG. 14, the service selection processing at FIG. 8/STEP 363 is described below. This processing is executed by the navigation server 100 after driving of the user's vehicle 2 ends.

Firstly the server arithmetic processing element 110 determines whether or not the evaluation cumulative value TP of the user identifier UID exceeds a first value V1 (FIG. 14/STEP 3631). When the determination result is negative (FIG. 14/STEP 3631 . . . NO), the server arithmetic processing element 110 ends the processing without selecting a service applied.

When the determination result is affirmative (FIG. 14/STEP 3631 . . . YES), the server arithmetic processing element 110 determines whether or not the evaluation cumulative value TP of the user identifier UID exceeds a second value V2 (V2>V1) (FIG. 14/STEP 3632).

When the determination result is negative, the server arithmetic processing element 110 selects a first service (e.g., discount service of rental-car fee) as a service that the user of the user identifier UID can use (FIG. 14/STEP 3633).

When the determination result is affirmative, the server arithmetic processing element 110 selects a second service (e.g., discount service of maintenance fee) that is different from the first service in contents or degree as a service that the user of the user identifier UID can use (FIG. 14/STEP 3634).

The server arithmetic processing element 110 stores, in the support database 102, a value obtained by subtracting a point or the like (e.g., the second value V2) corresponding to the service application from the evaluation cumulative value TP as needed, as a new evaluation cumulative value TP.

When accessing the navigation server 100 via the communication terminal 300 or the like later, the user can check the evaluation cumulative value and a service that can be used at the time of the access (FIG. 2/STEP 400).

Advantageous Effects of Navigation System

According to the navigation server 100 of the present embodiment, the navigation client 200 is permitted to access the navigation server 100 of the navigation client 200 when the navigation client 200 meets the "first condition". The "first condition" is that "an authentication code Ukey that the server communication device 130 recognizes is stored in the support database 102". Thereafter, when the navigation client 200 meets the "second condition", the navigation client 200 is prohibited from accessing the navigation server 100. The "second condition" is a condition "that is determined based on the past communication contents with the navigation client 200".

After prohibiting the navigation client 200 from accessing the navigation server 100, in order to return the access to the permissible state so as to allow the navigation client 200 to receive a service including the provision of the first information specific of the navigation client based on a communication with the navigation server 100, the user is required to input the authentication code Ukey specific to the user that is stored in the support database 102 beforehand to the navigation client 200.

This configuration can avoid the situation where, even when the navigation client 200 meets the first condition once, the navigation client 200 receives a service unconditionally, which results in that the state in which a third person acquires the first information of another person is continued unlimitedly. This configuration, on the other hand, can avoid the user from being requested to input the authentication code Ukey every time when starting the navigation client 200 during a predetermined duration after the navigation client 200 meets the first condition. This can protect information specific to the user within a range of not degrading user-friendliness.

According to the thus configured navigation server 100, the navigation client 200 is requested to output access information, which can urge the user of the navigation client to use a terminal that is different from the navigation client outputting the access information. This can protect information specific to the user within a range of not degrading user-friendliness.

According to the thus configured navigation server 100, since an evaluation value EP is given in response to a new input of the authentication code Ukey before the second condition is met, a motivation to update the setting of the navigation client 200 at any time can be given to the user. As a result, setting of the navigation client 200 can be updated appropriately based on the intention of the user, and the situation where old user information is left in the navigation client 200 can be avoided, and so information specific to the user can be protected with a range of not degrading user-friendliness.

According to the thus configured navigation server 100, information including the second information, which is often transmitted from the navigation client 200 to the navigation server 100, can be protected. This allows the navigation server 100 to protect the information including the second information from a third person, and to provide a service utilizing the second information to an appropriate user.

When a parking position where the vehicle was parked most frequently or for the longest time during a first duration and a parking position where the vehicle was parked most frequently or for the longest time during a second duration that is different form the first duration, which is shown in the past communication contents with the navigation client 200, are different, there is a possibility that the navigation client 200 is transferred or is lent to a third person.

When any one of plurality of parking positions where the vehicle was parked frequently or for a long time among parking positions of the vehicle that are shown in the past communication contents with the navigation client 200 during a third duration is not the same as parking positions where the vehicle was parked during a predetermined fourth duration that is different from the third duration, there is a possibility that the navigation client 200 is transferred or is lent to a third person.

When a predetermined fifth duration has passed since an authentication code Ukey was input last time, which is specified based on the past communication contents with the navigation client 200, there is a possibility that the navigation client 200 is transferred or is lent to a third person. Also, when a predetermined sixth duration has passed since the access was made to the navigation server 100 last time, which is specified based on the past communication contents with the navigation client 200, there is a possibility that the navigation client is transferred or is lent to a third person.

According to the navigation server 100 of the present embodiment that is configured focusing on these points, if the navigation client 200 may be transferred or lent to a third person, an access of the navigation client 200 to the navigation server 100 is prohibited, and a message requesting the input of an authentication code is output to the navigation client 200. As a result, information specific to the user can be protected within a range of not degrading the user-friendliness.

The thus configured navigation server 100 can avoid the situation where a third person can acquire the first information of another person, which is recognized with a communication with the navigation client 200, is continued unlimitedly. This can protect information specific to the user within a range of not degrading user-friendliness.

According to the thus configured navigation client 200, the collection duration of the first information can be designated by a user, and so the first information intended by the user can be utilized at the navigation client 200 and the navigation server 100, whereas the first information that is collected against the intention of the user is not viewed by another user. This results in protection of information specific to the user within a range of not degrading user-friendliness.

Other Embodiments

Figure 15:
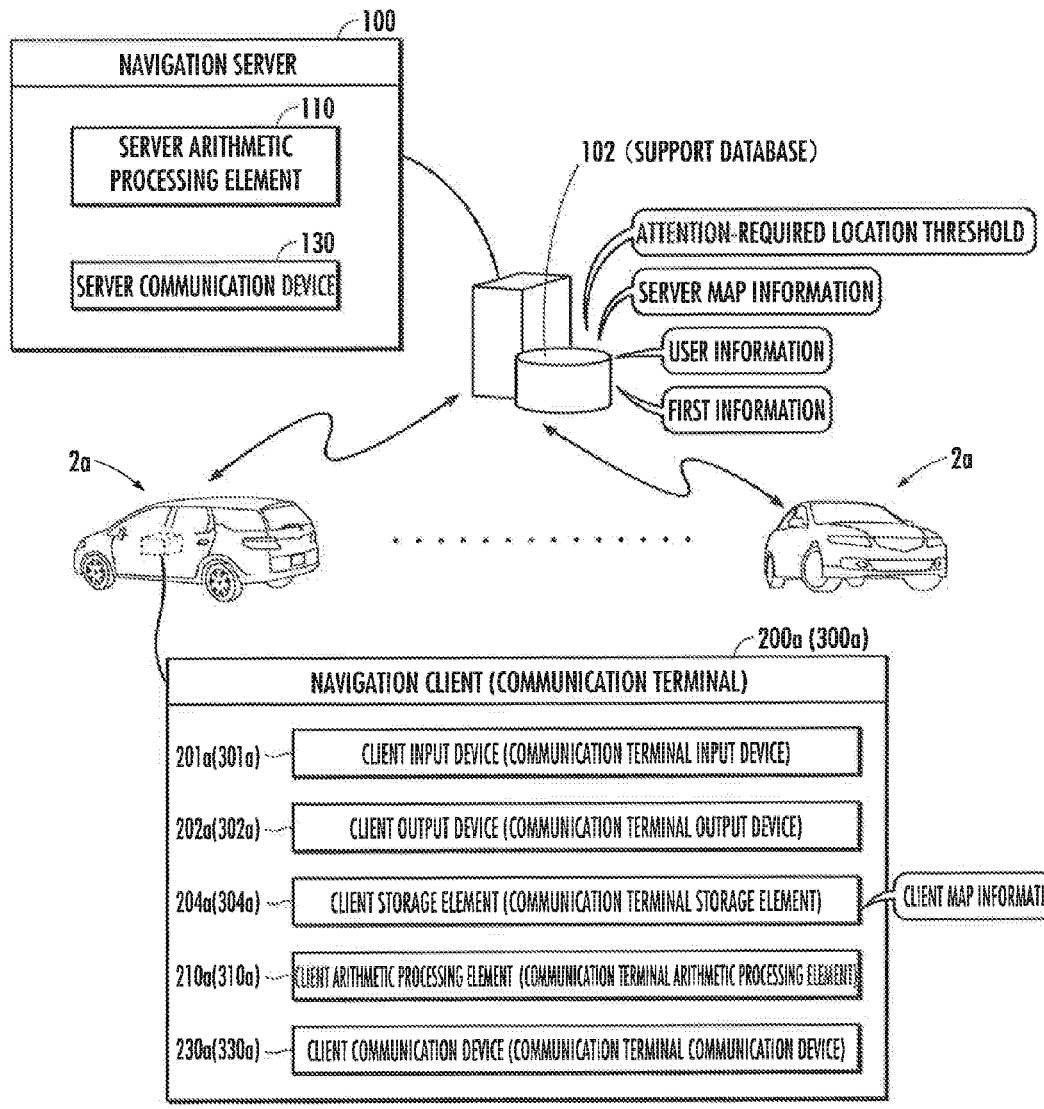
FIG. 15A describes the overall configuration of an embodiment when the communication terminal is used as a part or the entire of the navigation client, illustrating a case where the communication terminal configures a new navigation client.
FIG. 15B describes the overall configuration of the embodiment when the communication terminal is used as a part or the entire of the navigation client, illustrating a case where a part of elements of vehicle-mounted equipment and a part of elements of the communication terminal configures a new navigation client.
Figure 15:
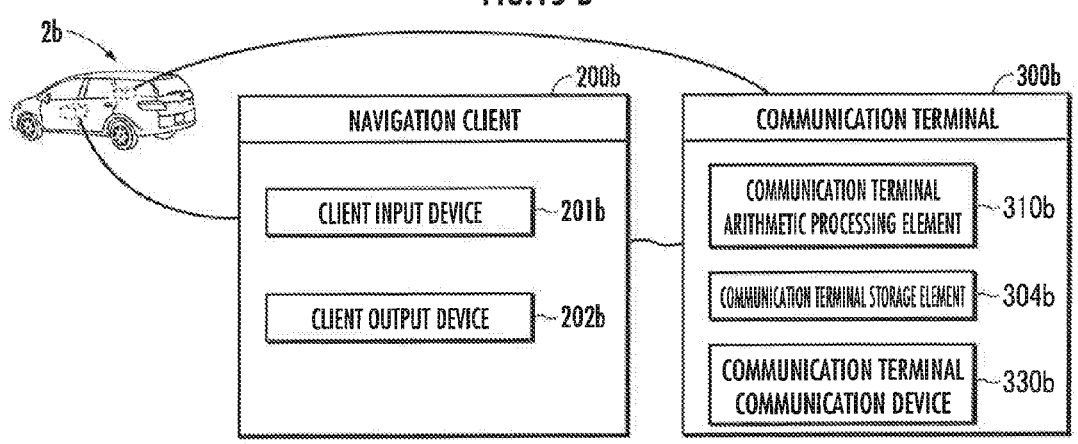

The present embodiment describes the navigation client 200 and the communication terminal 300 that are configured as different enclosures. Instead, as illustrated in FIG. 15A, a communication terminal 300a with a navigation application installed therein may be used as a navigation client. In this case, the communication terminal 300a may be configured to, after being electrically connected to a user's vehicle 2a via a wireless communication or a wire communication, and then acquire vehicle control information such as a vehicle speed, positional information and the like from the user's vehicle 2a.

As illustrated in FIG. 15B, a configuration of a part of the a navigation client 200b (e.g., a client input device 201b and a client output device 202b) and a configuration of a part of a communication terminal 300b (a communication terminal storage element 304b, a communication terminal arithmetic processing element 310b, and a communication terminal communication device 330b) may configure a new navigation client.

When both of the navigation client 200 and the communication terminal 300 with a navigation application installed therein are available, a user may select to use any one of the navigation client 200 and the communication terminal 300.

Figure 16:
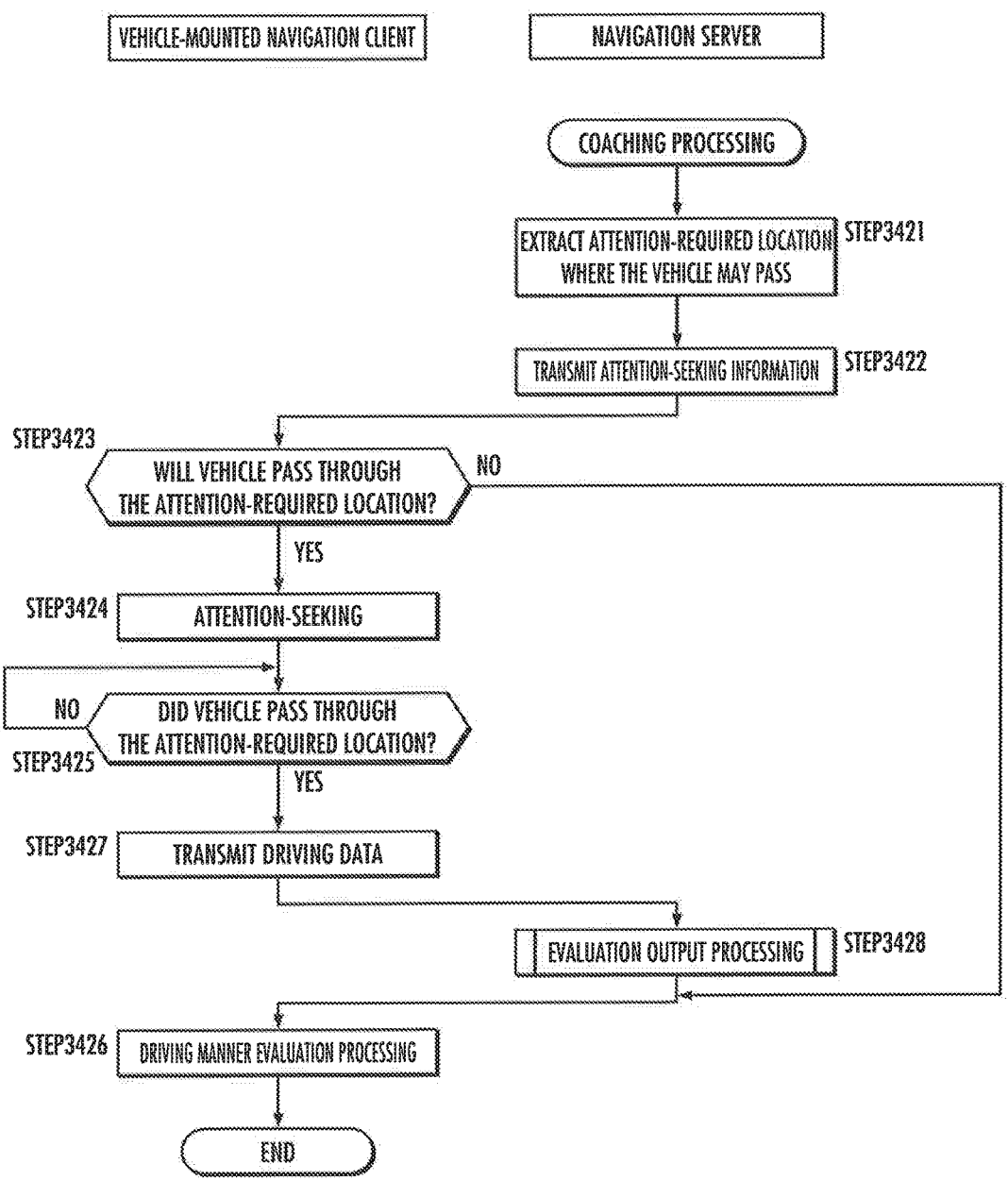
FIG. 16 is a flowchart of the coaching processing when an evaluation of a driving manner at an attention-required location is performed by the navigation server.

In the present embodiment, the client arithmetic processing element 210 evaluates the driving manner at an attention-required location (FIG. 11/STEP 350). Instead, as illustrated in FIG. 16, the client arithmetic processing element 210 may transmit driving data FCD to a server via the client communication device 230 (FIG. 16/STEP 3427), and the server arithmetic processing element 110 may evaluate the driving manner at an attention-required location based on the driving data FCD (FIG. 16/STEP 3428). The driving evaluation processing at FIG. 16/STEP 3428 is similar processing to the driving evaluation processing that the client arithmetic processing element 210 performs at FIG. 11/STEP 350.

In the present embodiment, the client evaluation value CP that the client arithmetic processing element 210 evaluates is uploaded to the navigation server 100 together with the driving data FCD (FIG. 8/STEP 361), and the server arithmetic processing element 110 calculates a server evaluation value SP through the evaluation of the driving data, and adds the server evaluation value SP and the client evaluation value CP to the evaluation cumulative value TP (FIG. 8/STEP 362). Instead of this, the driving data FCD may be uploaded to the navigation server 100 (FIG. 17A/STEP 3611), and only the server evaluation value SP may be added to the evaluation cumulative value TP (FIG. 17A/STEP 3621).

Figure 17:
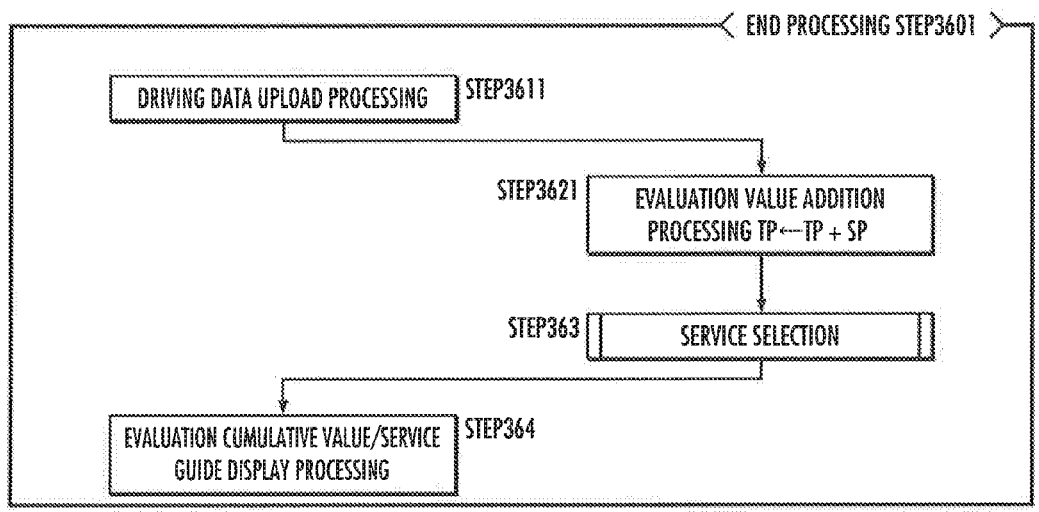
FIG. 17A is a flowchart to describe another embodiment of the end processing of the driving support processing of FIG. 8, illustrating a case where the navigation server only determines a server evaluation value.
FIG. 17B is a flowchart to describe still another embodiment of the end processing of the driving support processing of FIG. 8, illustrating a case where the navigation client only determines a client evaluation value.
Figure 17:
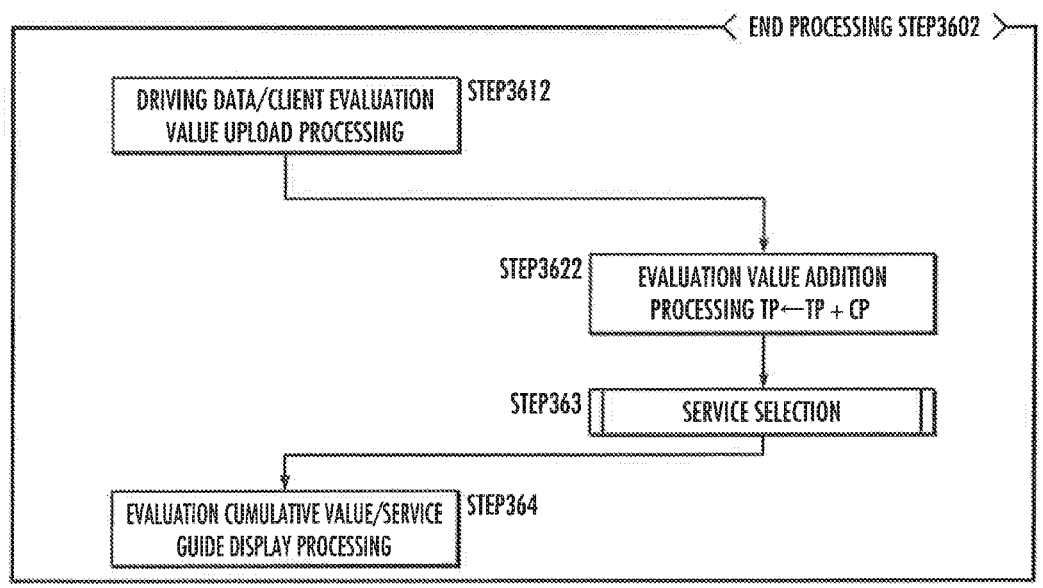

Instead of this, the client evaluation value CP that the client arithmetic processing element 210 evaluates may be uploaded to the navigation server 100 together with the driving data FCD (FIG. 17B/STEP 3612), and only the client evaluation value CP may be added to the evaluation cumulative value TP (FIG. 17B/STEP 3622).

DESCRIPTION OF REFERENCE NUMERALS

100: navigation server, 102: support database (server storage element), 110: server arithmetic processing element, 130: server communication device, 200: navigation client, 201: client input device, 202: client output device, 204: client storage element, 210: client arithmetic processing element, 230: client communication device, UID: user identifier, Ukey: user authentication code, CID: vehicle identifier, TP: evaluation cumulative value, CP: client evaluation value, SP: server evaluation value

What is claimed is:

1. A navigation server, comprising a server communication device, a server authentication arithmetic processing element, and a server storage element to store data, wherein
the server storage element is configured to associate an authentication code specific to a user of a navigation client mounted to a user vehicle and first information specific to the user that is received from the navigation client via the server communication device for storage,
the server communication device is configured to recognize the authentication code that is input last time at the navigation client based on a communication with the navigation client,
the server authentication arithmetic processing element is configured to, when the navigation client meets a first condition that the authentication code recognized by the server communication device is stored in the server storage element, permits the navigation client to access the navigation server, and when the navigation client meets a second condition that is determined based on past communication contents with the navigation client before the authentication code is input last time at the navigation client, prohibit the navigation client from accessing the navigation server,
when the navigation client is permitted to access the navigation server by the server authentication arithmetic processing element, the server communication device makes the navigation client recognize the first information that is associated with the authentication code of the user of the navigation client and is stored in the server storage element,
when the navigation client is prohibited from accessing the navigation server by the server authentication arithmetic processing element, the server communication device makes the navigation client output a message urging to input the authentication code of the user of the navigation client, and determines whether or not to permit the navigation client to access the navigation server depending on the input authentication code,
wherein the first information includes second information that is specific to the user, which is collected by the navigation client,
wherein the second information includes information of a parking position and a parking duration of the user vehicle, and
wherein the second condition is at least one of conditions including: a condition that a parking position where the user vehicle is parked most frequently or for a longest time, which is shown in the second information received from the navigation client during a predetermined first duration is different from a parking position where the user vehicle is parked most frequently or for a longest time, which is shown in the second information received from the navigation client during a predetermined second duration that is different form the first duration, and a condition that a plurality of parking positions where the user vehicle is parked frequently or for a long time among parking positions of the user vehicle that are shown in the second information received from the navigation client during a predetermined third duration are all different from parking positions where the user vehicle is parked that are shown in the second information received from the navigation client during a predetermined fourth duration that is different from the third duration.

2. The navigation server according to claim 1, wherein
the server storage element is configured to associate in advance the authentication code of the user with an evaluation cumulative value of the user that is accumulated when the navigation client is used, for storage,
the server authentication arithmetic processing element is configured to select a service that the user can use in accordance with the evaluation cumulative value of the user, and
the server communication device is configured to make the navigation client output access information to make a notification of the service.

3. The navigation server according to claim 2, wherein
the server authentication arithmetic processing element is configured to make the navigation client output a message urging to input the authentication code even when the second condition is not met in a communication via the server communication device, and also to add, to the evaluation cumulative value, an evaluation value corresponding to a new input of the authentication code when the second condition is not met, and store a resultant to the server storage element.

4. The navigation server according to claim 1, wherein
the second condition is at least one of conditions including: a condition that a predetermined fifth duration has passed since the authentication code is input at the navigation client last time, which is specified based on past communication contents with the navigation client; and a condition a sixth duration has passed since an access is made to the navigation server from the navigation client last time, which is specified based on past communication contents with the navigation client.

5. The navigation server according to claim 1, wherein
the server communication device is configured to recognize the authentication code and the first information based on communication with the navigation client, and
the server storage element is configured to associate the authentication code and the first information, which are recognized by the server communication device, for storage.

* * * * *